(12) United States Patent
Tani

(10) Patent No.: US 7,579,065 B2
(45) Date of Patent: *Aug. 25, 2009

(54) ELECTROPHOTOGRAPHIC IMAGE RECEIVING SHEET AND METHOD OF FORMING ELECTROPHOTOGRAPHIC IMAGE

(75) Inventor: Yoshio Tani, Shizuoka (JP)

(73) Assignee: FUJIFILM Corporation, Tokyo (JP)

( * ) Notice: Subject to any disclaimer, the term of this patent is extended or adjusted under 35 U.S.C. 154(b) by 308 days.

This patent is subject to a terminal disclaimer.

(21) Appl. No.: 11/018,547

(22) Filed: Dec. 22, 2004

(65) Prior Publication Data

US 2005/0136261 A1   Jun. 23, 2005

(30) Foreign Application Priority Data

Dec. 22, 2003   (JP) ............................. 2003-425593

(51) Int. Cl.
*B32B 5/16* (2006.01)
*B32B 7/00* (2006.01)

(52) U.S. Cl. .................. 428/206; 428/212; 428/327; 428/473.5; 428/474.4; 428/537.5; 428/195.1; 428/480; 430/124

(58) Field of Classification Search ............... 430/124; 428/195.1, 206, 212, 327, 473.5, 474.4, 537.5, 428/480

See application file for complete search history.

(56) References Cited

U.S. PATENT DOCUMENTS

| 5,104,721 | A |   | 4/1992 | Sun |
|---|---|---|---|---|
| 5,853,875 | A | * | 12/1998 | Toshida et al. ............ 428/349 |
| 6,203,956 | B1 | * | 3/2001 | Urano et al. ............ 430/111.4 |
| 6,413,691 | B2 | * | 7/2002 | Daimon et al. ........... 430/109.4 |
| 6,582,869 | B2 | * | 6/2003 | Daimon et al. ........... 430/109.4 |
| 6,916,586 | B2 | * | 7/2005 | Ishiyama et al. ......... 430/106.1 |
| 7,267,864 | B2 | * | 9/2007 | Ide et al. .................... 428/212 |
| 2002/0018952 | A1 | * | 2/2002 | Daimon et al. ........... 430/109.4 |
| 2003/0224192 | A1 | * | 12/2003 | Tani et al. .................... 428/485 |
| 2004/0037596 | A1 | * | 2/2004 | Nakamura et al. .......... 399/328 |
| 2005/0214485 | A1 | * | 9/2005 | Ide et al. .................. 428/32.38 |
| 2005/0214669 | A1 | * | 9/2005 | Hayashi et al. ........... 430/109.4 |

FOREIGN PATENT DOCUMENTS

JP   6-75417   3/1994

\* cited by examiner

*Primary Examiner*—Betelhem Shewareged
(74) *Attorney, Agent, or Firm*—Young & Thompson

(57) ABSTRACT

An electrophotographic image receiving sheet comprises a support and a toner image receiving layer that is formed on at least one surface of the support and contains a mixture of a linear amorphous polymer having a glass-transition temperature (Tg1) in a range of from 40° to 120° C. and a linear crystalline polymer having a melting temperature (Tm) in a range of from 100° to 200° C. These linear amorphous polymer and linear crystalline polymer satisfy $1.0 \times Tg1(K) \leq Tm(K) \leq 1.5 \times Tg1(K)$.

5 Claims, 3 Drawing Sheets

ELECTROPHOTOGRAPHIC IMAGE RECEIVING SHEET AND METHOD OF FORMING ELECTROPHOTOGRAPHIC IMAGE

BACKGROUND OF THE INVENTION

1. Field of the Invention

The present invention relates to a high quality electrophotographic image receiving sheet having a combination of excellent toner fixation, high adhesion resistance and reliable transport qualities, and an electrophotographic image forming method for use with the electrophotographic image receiving sheet.

2. Description of Related Art

Electrophotography has been widely used as output equipments such as copying machines and printers for use with personal computers on the grounds of printing out on general-purpose paper such as plain paper and bond paper at a high printing speed in a dry process. Electrophotographic image receiving sheets for use in the electrophotographic printing has a toner image receiving layer. This toner image receiving layer can be formed in various processes, for example, such as a process of laminating a thermoplastic resin on a support sheet made of base paper by means of melt extrusion or a process of coating the support sheet with a liquid solution of resin. Thermoplastic resins that are ordinary employed for the toner image receiving layer are amorphous polymers having glass-transition temperatures (Tg) in a range of from a temperature higher than the ambient temperature to a temperature several tens of degrees in centigrade below a potential toner fixing temperature. However, the amorphous polymers are excellent in adhesion to toner and, at the same time, apt to cause adhering trouble between the toner image receiving layers due to their high adhesion strength.

On the contrary, since crystalline polymers even having glass-transition temperatures (Tg) in a range of subzero temperatures are soft in adhesion at ambient temperatures, they do not cause adhering troubles between the toner image receiving layers, nevertheless there is a problem that fixed toner falls away from the toner image receiving later due to insufficient adhesion strength of the crystalline polymer.

As just described, the polymers, amorphous or crystalline, have their inherent defects crying out for solutions. U.S. Pat. No. 5,104,721 discloses an electrophotographic printing media that contain a crystalline polymeric pigment in an image receiving layer comprising an amorphous polymer in major proportion polymeric as one of the solutions. However, the pigment, that is added as a matting agent with the intention of adjusting a coefficient of dynamic friction, is particulate matter and poor in compatibility with amorphous polymeric materials.

SUMMARY OF THE INVENTION

It is therefore an object of the present invention to provide a high quality electrophotographic image receiving sheet having a combination of excellent toner fixation, high adhesion resistance and reliable transport qualities.

It is another object of the present invention to provide an image forming method of forming a high quality image on the electrophotographic image receiving sheet.

The above object of the present invention is accomplished by an electrophotographic image receiving sheet comprising a support and a toner image receiving layer formed on at least one surface of the support which contains a mixture of a linear amorphous polymer having a glass-transition temperature (Tg1) desirably in a range of from 40° to 120° C., and more desirably in a range of from 50° to 100° C. and a linear crystalline polymer having a melting temperature (Tm) in a range of from 100° to 200° C., and more desirably in a range of from 120° to 170° C.

It is preferred for the electrophotographic image receiving sheet that the linear amorphous polymer and the linear crystalline polymer satisfy the following condition:

$$1.0 \times Tg1(K) \leq Tm(K) \leq 1.5 \times Tg1(K)$$

The mixture is desirably provided by mixing the linear amorphous polymer and the linear crystalline polymer desirably at a mass ration of between 1:9 and 9:1.

It is preferred for the linear crystalline polymer to be a linear saturated crystalline polyester resin and to comprise at least one selected from a group consisting of polyester resins, polyolefin resins, polyamide resins, polyether resins, polyvinyl alcohol resins, polyester amide resins, polyether ester resins, polyvinyl chloride resins, polymethacrylic acid ester, copolymers of these resins, and mixtures of these resins.

The toner image receiving layer desirably contains the mixture 50% by mass in solid content relative to a total mass of a composition of the toner image receiving layer.

Preferred toners to be transferred to the toner image receiving layer contain a binder resin having a glass-transition temperature (Tg2) in a range of from 40° to 120° C. It is preferable for the binder resin to have a glass-transition temperature (Tg2)(K)) that satisfies the following condition:

$$1.0 \times Tg2(K) \leq Tm(K) \leq 1.5 \times Tg2(K)$$

The support for the electrophotographic image receiving sheet may comprise a base paper sheet having a polyolefin resin layer formed on at least one surface thereof.

The other object of the present invention is accomplished by an image forming method of forming a toner image on the electrophotographic image receiving described above that comprises the steps of: forming a toner image on the electrophotographic image receiving sheet; fixing and smoothing the toner image by heating, pressing and cooling the toner image with a belt-fixing type smoothing equipment having a heating and pressing device, a fixing belt and cooling device; and peeling off the electrophotographic image receiving sheet from the fixing belt.

The fixing belt comprises a support and a surface layer of fluorocarbon siloxane rubber, desirably having at least one of a perfluoroalkyl ether group and a perfluoroalkyl group in a principal chain, formed on the support. More desirably, the fixing belt comprises a support, a base layer of silicone rubber formed on the support and a surface layer of fluorocarbon siloxane rubber, desirably having at least one of a perfluoroalkyl ether group and a perfluoroalkyl group in a principal chain, formed on the base layer.

As a result of comprising a toner image receiving layer formed on at least one surface of a support which contains a mixture of a linear amorphous polymer having a glass-transition temperature (Tg1) in a range of from 40° to 120° C., and more desirably in a range of from 50° to 100° C. and a linear crystalline polymer having a melting temperature (Tm) in a range of from 100° to 200° C., and more desirably in a range of from 120° to 170° C., it is realized to provide a high quality electrophotographic image receiving sheet that keeps its toner image receiving layer from adhering to one of another electrophotographic image receiving sheet despite of its high adhesion to toner and, at the same time, materializes not only excellent brittleness but also a combination of excellent toner fixation, high adhesion resistance and reliable transport qualities.

Further, according to the image forming method for use with the electrophotographic image receiving sheet, an image is formed on the electrophotographic image receiving sheet with a belt fixing-type smoothing equipment having a heating and pressing device, a fixing belt and cooling device. In consequence, even when using an oilless machine without using fixing oils, it is realized to transport stably the electrophotographic image receiving sheet without causing offset of a toner image to a fixing belt and/or a fixing belt concurrently with providing glossy, photographically aesthetic and high quality images.

BRIEF DESCRIPTION OF THE DRAWINGS

The foregoing and other objects and features of the present invention will be clearly understood from the following detailed description when read with reference to the accompanying drawings, in which.

Figure 1:
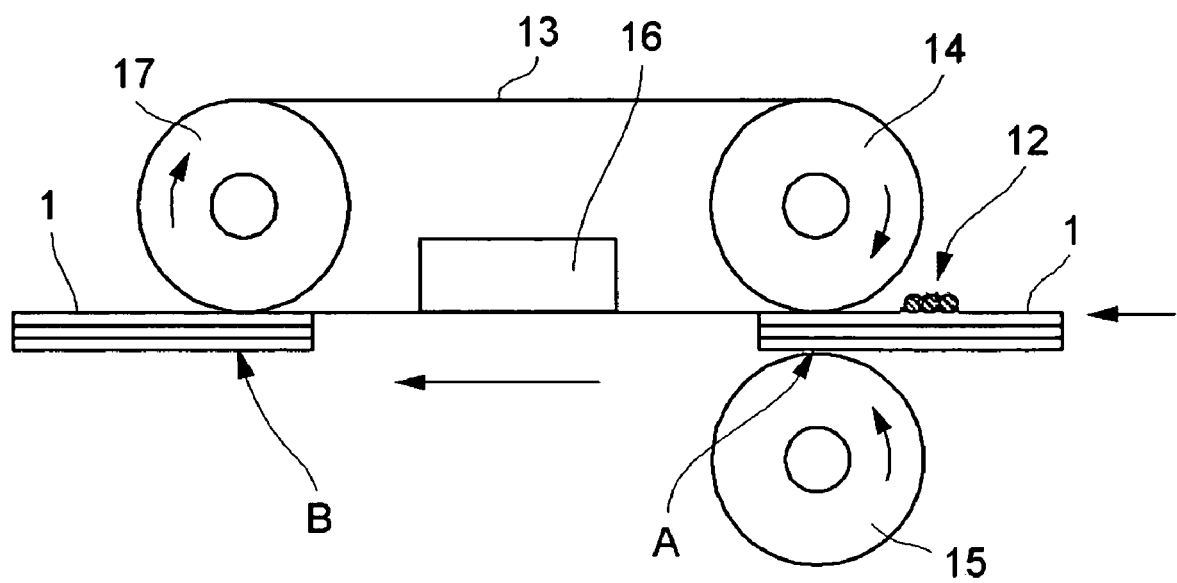
FIG. 1 is a schematic view showing a belt-fixing type electrophotographic machine for implementing the image forming method of the present invention by way of example.

DETAILED DESCRIPTION OF THE PREFERRED EMBODIMENTS (Electrophotographic Image Receiving Sheet)

An electrophotographic image receiving sheet according to a preferred embodiment of the present invention comprises a support or substrate and at least a toner image receiving layer coated on the support and may, if desired, further comprises one or mode additional layers selected from a group including a protective layer, a cushioning layer, an electrostatic charge adjusting or antistatic layer, a reflective layer, a color tincture adjusting layer, an anti-adhesive layer, an anti-curling layer, a smoothing layer, etc. Each of these layers may be of a single layer structure or a multi-layered structure.

[Toner Image Receiving Layer]

The toner image receiving layer, which is a receptor for color toner or black toner in order form a toner image thereon, receives toner for image formation from a developing drum or an intermediate image transfer material with electrostatics or pressure in a transfer process and then fixes the toner image with hear or pressure in a fixing process.

The toner image receiving layer contains a mixture of a liner amorphous polymer and a linear crystalline polymer and may optionally contain other components as appropriate. In this instance, the terms "linear amorphous polymer" and "linear crystalline polymer" as used herein shall mean and refer to polymers that can be identified through the following method. That is, a polymer is heated to a temperature in a range of from a room temperature to 320° in an atmosphere of nitrogen and is kept as it is for ten minutes. Subsequently, the polymer is cooled off to the room temperature and, immediately thereafter, heated again to 320° at a programming rate of 5° C./minute using a differential scanning colorimeter (DSC) in order to obtain an endothermic curve resulting from crystal fusion. The polymer whose endothermic curve shows an appreciable exothermic peak attributed to crystallization (a peak of crystallinity) is defined as a linear crystalline polymer. On the other hand, the polymer whose endothermic curve does not show such an exothermic peak is defined as a linear amorphous polymer.

Preferred examples of linear amorphous polymers are thermoplastic resins in terms of productivity. Specific examples include, but not limited to, amorphous polyester resins, polyvinyl chloride resins, polystyrene resins, acrylonitrile-styrene copolymers, acrylonitrile-butadiene-styrene copolymers, polymethylmethacrylic acrylates, polycarbonates, modified polyphenylene ether, polyallylates, polysulfone, polyetherimide, polyamide-imide, polyimide, copolymers containing these in major proportions, mixtures of these resins, and the like. Among them, the amorphous polyester resins, the copolymers containing these resins or mix of these resins are more preferred.

Preferred examples of linear crystalline polymers are thermoplastic resins in terms of productivity. Specific examples include, but not limited to, crystalline polyester resins such as polyethylene terephthalate, polyethylene-2,6-naphthalate, polypropylene terephthalate, polybutylene terephthalate; polyolefin such as polyethylene and polypropylene; polyamide; polyether; polyester amide; polyether ester; polyvinyl alcohol; polymethacrylic acid ester; copolymers containing these resins in major proportions, mixtures of these resins, and the like. Among them, the crystalline polyester resins, the polyolefin resins, the copolymers containing these polyolefin resins or mixtures of these resins are more preferred, and linear saturated crystalline polyester resins are most preferred.

The linear amorphous polymer should have a glass-transition temperature (Tg1) desirably in a range of from 40° to 120° C., and more desirably in a range of from 50° to 100° C. The linear crystalline polymer should have a melting temperature (Tm) desirably in a range of from 100° to 200° C., and more desirably in a range of from 120° to 170° C. Further, the binder resin contained in the toner to be received by the toner image receiving layer should have a glass-transition temperature (Tg2) desirably in a range of from 40° to 120° C., and more desirably in a range of from 50° to 100° C. If the amorphous polymer, the binder resin and the crystalline polymer exceed their own lower limit temperatures, respectively, the toner image receiving layer encounters a deterioration in adhesion resistance, possibly making the electrophotographic image receiving sheets to become apt to adhere to each other during hot storage and, on the other hand, encounters a deterioration in transport qualities through image forming machines, possibly making the electrophotographic image receiving sheet to become apt to cause jamming when passing through image forming machines. On the contrary, if the amorphous polymer, the binder resin and the crystalline polymer exceed their own upper limit temperatures, respectively, the toner image receiving layer encounters a decrease in toner fixation, loosing gloss, causing a deterioration in image quality resulting from an edge void effect and easily cracking a toner image when the electrophotographic image receiving sheet is bent.

The linear amorphous polymer and the linear crystalline polymer should desirably satisfy a condition of $1.0 \times Tg1(K) \leq Tm(K) \leq 1.5 \times Tg1(K)$, and more desirably a condition of $1.1 \times Tg1(K) \leq Tm(K) \leq 1.4 \times Tg1(K)$. If the condition is unsatisfied, the toner image receiving layer encounters deterioration in sharp melting property, possibly becoming incapable of striking a balance between toner fixation and quality and adhesion resistance of an image. It is to be feared that the problem of phase separations occur is encountered after image fixation according to fixing temperatures and, in addition, with age, leading to deterioration in glossiness.

The binder resin of the toner to be transferred to the toner image receiving layer and the crystalline polymer should desirably satisfy a condition of $1.0 \times Tg2(K) \leq Tm(K) \leq 1.5 \times Tg2(K)$, and more desirably the condition of $1.1 \times Tg2(K) \leq Tm(K) \leq 1.4 \times Tg2(K)$. If the condition is unsatisfied, the toner image receiving layer possibly becomes incapable of striking a balance between toner fixation and quality and adhesion resistance of an image. It is to be feared that the problem of phase separations occur is encountered after image fixation according to fixing temperatures and, in addition, with age, leading to deterioration in glossiness.

The glass-transition temperatures (Tg1), (Tg2) and the melting temperature Tm are is measured by differential scanning colorimetry (DSC). That is, as described above, the resin is heated to a temperature in a range of from a room temperature to 320° C. in an atmosphere of nitrogen and is kept as it is for ten minutes. Subsequently, the resin is cooled off to the room temperature and, immediately thereafter, heated again to 320° at a programming rate of 5° C./minute using a differential scanning colorimeter (DSC). The temperatures (Tg1, Tg2 and Tm) are found from an measured endothermic curve resulting from crystal fusion.

The mixture of the linear amorphous polymer and the linear crystalline polymer whose content should desirably be greater than 50% by mass in solid content, and more desirably greater than 70% by mass in solid content, relative to a total mass of a composition of the toner image receiving layer. The mixture should have a mass ratio (linear amorphous polymer versus linear crystalline polymer) desirably in a range of from 1:9 to 9:1, and more desirably in a range of from 2:8 to 8:2. If the amorphous polymer content is too small, the toner image receiving layer possibly takes on a decrease in toner fixation, and the electrophotographic image receiving sheet possibly provides surface embrittlement and/or coarse surface. On the other hand, if the crystalline polymer content is too small, the toner image receiving layer takes on a decrease in adhesion resistance, and the electrophotographic image receiving sheet encounters deterioration in transport quality.

Examples of other components that the toner image receiving layer may optionally contain as appropriate include various additives for improving thermo dynamic properties such as releasing agents, plasticizing agents, coloring agents, fillers, cross-linking agents, antistatic or electrostatic charge adjusting agents, and the like.

-Releasing Agent-

The releasing agent is blended in the toner image receiving layer to prevent the toner image receiving layer from offsetting. The releasing agent is not limited in type as long as it thermally melts at a fixing temperature sufficiently high enough to separate out onto the surface of the toner image receiving layer in a mal-distribution state and further forms a surface layer of releasing material on the toner image receiving layer resulting from cooling and solidification. Examples of the releasing agent having these function and effect mentioned above include at least one selected from a group of silicon compounds, fluorine compounds, wax and matting agents, and desirably from a group of silicone oils, polyethylene waxes, carnauba waxes, silicone particles and polyethylene wax particles.

There are a number of available releasing agents such as compounds enumerated in "Revised Edition: Property and Application of Wax" (Koushobou) and "Silicone Handbook" (Nikkan Kogyo Shinbun). Further, it is preferred to use silicone compounds, fluorine compounds or waxes that are used for toners disclose in Japanese Patent Nos. 2,838,498 and 2,949,558; Japanese Patent Publication Nos. 59(1984)-38581 and 4(1992)-32380; Japanese Unexamined Patent Publication Nos. 50(1975)-117433, 52(1977)-52640, 57(1982)-148755, 61(1986)-62056, 61(1986)-62057, 61(1986)-118760, 2(1990)-42451, 3(1991)41465, 4(1992)-212175, 4(1992)-214570, 4(1992)-263267, 5(1993)-34966, 5(1993)-119514, 6(1994)-59502, 6(1994)-161150, 6(1994)-175396, 6(1994)-219040, 6(1994)-230600, 6(1995)-295093, 7(1995)-36210, 7(1995)43940, 7(1995)-56387, 7(1995)-56390, 7(1995)64335, 7(1995)-199681, 7(1995)-223362, 7(1995)-287413, 8(1996)-184992, 8(1996)-227180, 8(1996)-248671, 8(1996)-2487799, 8(1996)-248801, 8(1996)-278663, 9(1997)-152739, 9(1997)-160278, 9(1997)-185181, 9(1997)-319139, 9(1997)-319413, 10(1998)-20549, 10(1998)-48889, 10(1998)-198069, 10(1998)-207116, 11(1999)-2917, 11(1999)449669, 11(1999)-65156, 11(1999)-73049 and 11(1999)-194542. These compounds can be used individually or in any combination of two or more thereof.

Specifically, preferred examples of the silicone type compounds include: non-modified silicone oils such as dimethyl siloxane oils, methyl hydrogen silicone oils and phenylmethyl silicone oils such as commercially available under the trade names of, for example, KF-96, KF-96L, KF-96H, KF-99, KF-50, KF-54, KF-56, KF-965, KF-968, KF-994, KF-995, HIVAC, F-4 and F-5 (Shinetsu Chemical Industry Co., Ltd.), SH200, SH203, SH490, SH510, SH550, SH710, SH704, SH705, SH7028A, SH7036, SM7060, SM7001, SM7706, SM7036, SH871107 and SH8627 (Toray Dow Corning Silicone Co.; Ltd.), TSF400, TSF401, TSF404, TSF405, TSF431, TSF433, TSF434, TSF437, TSF450, TSF451, TSF456, TSF458, TSF483, TSF484, TSF4045, TSF4300, TSF4600, YF-33, YF-3057 YF-3800, YF-3802 YF-3804, YF-3807, YF-3897, XF-3905, XS69-A1753, TEX100, TEX101, TEX102, TEX103, TEX104 and TSW831 (Toshiba Silicone Co., Ltd.); amino-modified silicone oils such as commercially available under the trade names of, for example, KF-857, KF-858, KF-859, KF-861, KF-864 and KF-880 (Shinetsu Chemical Industry Co., Ltd.), SF8417 and SM8709 (Toray Dow Corning Silicone Co., Ltd.), TSF4700, TSF4701, TSF4702, TSF4703, TSF4704, TSF4705, TSF4706, TEX150, TEX151 and TEX154 (Toshiba Silicone Co., Ltd.); carboxy-modified silicone oils such as commercially available under the trade names of, for example, BY-16-880 (Toray Dow Corning Silicone Co., Ltd.), TFS4770 and XF42-A9248 (Toshiba Silicone Co., Ltd.); carbinol-modified silicone oils such as commercially available under the trade name of, for example, XF42-B0970 (Toshiba Silicone Co., Ltd.); vinyl-modified silicone oils such as commercially available under the trade name of, for example, XF40-A1987 (Toshiba Silicone Co., Ltd.); epoxy-modified silicone oils such as commercially available under the trade names of, for example, SF8411 and SF8413 (Toray Dow Coning Co., Ltd.), TSF3965, TSF4730, TSF4732, XF42-A4439, XF42-A4438, XF42-A5041, XC96-A4462, XC96-A4462, XC96-A4463, XC96-A4464 and TEX170 (Toshiba Silicone Co., Ltd.); polyether-modified silicone oils such as commercially available under the trade names of, for example, KF-351(A), KF-352(A), KF-353(A), KF-354(A), KF-355(A), KF-615(A), KF-618(A) and KF-945(A) (Shinetsu Chemical Industry Co., Ltd.), SH3746, SH3771, SH8421, SH8419, SH8400 and SH8410 (Toray Dow Corning Silicone Co., Ltd.); TSF4440, TSF4441, TSF4445, TSF4446, TSF4450, TSF4452, TSF4453 and TSF4460 (Toshiba Silicone Co., Ltd.); silanol-modified silicone oils; methacryl-modified silicone oils; mercapto-modified silicone oils; alcohol-modified silicone oils such as commercially available under the trade names of SF8427 and SF8428 (Toray Dow Corning Silicone Co., Ltd.), TSF4750, TSF4751 and XF42-B0970 (Toshiba Silicone Co., Ltd.); alkyl-modified silicone oils such as commercially available under the trade names of, for example, SF8416 (moray Dow Corning Silicone Co., Ltd.), TSF410, TSF411, TSF4420, TSF4421, TSF4422, TSF4450, XF42-334, XF42-A3160 and XF42-A3161 (Toshiba Silicone Co., Ltd.); fluorine-modified silicone oils such as commercially available under the trade names of, for example, SF1265 (Toray Dow Corning Silicone Co., Ltd.), and FQF502 (Toshiba Silicone Co., Ltd.); silicone rubber or silicone particulates such as commercially available under the trade names of, for example, SH851U, SH745U, SH55UA, SE4705U, SH502UA&B, SRX539U, SE6770-P, DY38-038, DY38-047, Trefil F-201, Trefil F-202, Trefil F-250, Trefil R-900, Trefil R902A, Trefil E-500, Trefil E-600, Trefil E-601, Trefil E-506 and Trefil BY29-119 (Toray Dow Corning Silicone Co., Ltd.), Tospal 105, Tospal 120, Tospal 130, Tospal 145, Tospal 250 and Tospal 3120 (Toshiba Silicone Co., Ltd.); silicone-modified compounds of a silicone resin such as an olefin resin, a polyester resin, a vinyl resin, a polyamide resin, a cellulose resin, a phenoxy resin, a vinyl chloride-vinyl acetate resin, an urethane resin, an acryl resin, a styrene-acryl resin and copolymers of these resins which are commercially available under the trade names of, for example, Dialoma SP203, Dialoma SP712, Dialoma SP2105 and Dialoma SP2023 (Dainichiseika Color & Chemicals Mfg. Co., Ltd.), ModipaF S700, Modipa FS710, Modipa FS720, Modipa FS730 and Modipa FS770 (Oils & Fats Co., Ltd.), Saimack US-270, Saimack US-350, Saimack US-352, Saimack US-380, Saimack US-413, Saimack US-450, Rezeda GP-705, Rezeda GS-30, Rezeda GF-150 and Rezeda GF-300 (Toa Gosei Chemical Industry Co., Ltd.), SH997, SR2114, SH2104, SR2115, SR2202, DCI-2577, SR2317, SE4001U, SRX625B, SRX643, SRX439U, SRX488U, SH804, SH840, SR2107 and SR2115 (Toray Dow Corning Silicone Co., Ltd.), YR3370, TSR1122, TSR102, TSR108, TSR116, TSR117, TSR125A, TSR127B, TSR144, TSR180, TSR187, YR47, YR3187, YR3224, YR3232, YR3270, YR3286, YR3340, YR3365, TEX152, TX153, TEX171 and TEX172 (Toshiba Silicone Co., Ltd.); and reactive silicone compounds such as addition reaction type reactive silicone compounds, peroxide curing type reactive silicone compounds and ultraviolet curing type reactive silicone compounds which are commercially available under the trade names of, for example, TSR1500, TSR1510, TSR1511, TSR1515, TSR1520, YR3286, YR3340, PSA6574, TPR6500, TPR6501, TPR6600, TPR6702, TPR6604, TPR6701, TPR6705, TPR6707, TPR6708, TPR6710, TPR6712, TPR6721, TPR6722, UV9315, UV9425, UV9430, XS56-A2775, XS56-A2982, XS56-A3075, XS56-A3969, XS56-A5730, XS56-A8012, XS56-B1794, SL6100, SM3000, SM3030, SM3200 and YSR3022 (Toshiba Silicone Co., Ltd.).

Preferred examples of the fluorine compounds include: fluorine oils such as commercially available under the tradenames of, for example, Dyfloyl #1, Dyfloyl #3, Dyfloyl #10, Dyfloyl #20, Dyfloyl #50, Dyfloyl #100, Unidyn TG-440, Unidyn TG-440, Unidyn TG-452, Unidyn TG-490, Unidyn TG-560, Unidyn TG-561, Unidyn TG-590, Unidyn TG-652, Unidyn TG-670U, Unidyn TG-991, Unidyn TG-999, Unidyn TG-3010, Unidyn TG-3020 and Unidyn TG-3510 (Daikin Kogyo Co., Ltd.), MF-100, MF-110, MF-120, MF-130, MF-160 and MF-160E (Tokem Products Co., Ltd.), Surflon S-111, Surflon S-112, Surflon S-113, Surflon S-121, Surflon S-131, Surflon S-132, Surflon S-141 and Surflon S-145 (Asahi Glass Co., Ltd.), FC430 and FC431 (Mitsui Phluoro Chemicals Co., Ltd.); fluorine rubber such as commercially available under the tradename of, for example, LS63U (Toray Dow Corning Silicone Co., Ltd.); fluorine-modified resins such as commercially available under the tradenames of, for example, Modipa F200, Modipa F220, Modipa F600, Modipa F2020 and Modipa F3035 (Nippon Oils & Fats Co., Ltd.), Dialoma FF203 and Dialoma FF204 (Dainichiseika Color & Chemicals Mfg. Co., Ltd.), Surflon S-381, Surflon S-383, Surflon S-393, Surflon SC-101, Surflon SC-105, Surflon KH-40 and Surflon SA-100 (Asahi Glass Co., Ltd.), EF-351, EF-352, EF-801, EF-802, EF-601, TFE, TFEMA and PDFOH (Fokem Products Co., Ltd.), and THV-200P (Sumitomo 3M Ltd.); fluorosulfonate compounds such as commercially available under the tradenames of, for example, EF-101, EF-102, EF-103, EF-104, EF-105, EF-112, EF-121, EF122A, EF122B, EF-122C, EF-123A, EF-123B, EF-125M, EF-132, EF-135M, EF-305, FBSA, KFBS and LFBS (Tokem Products Co., Ltd.); fluorosulfonic acids; fluoride compounds or salts of fluoride compounds such as anhydrous fluoric acids, dilute fluoric acids, fluorobolic acids, zinc fluorobolite, nickel fluorobolate, tin fluorobolite, lead fluorobolite, cupric fluorobolate, hydrofluosilicic acids, potassium titanate fluoride, perfluoro caprylic acids, perfluoro ammonium octanate, etc.; and inorganic fluoride such as aluminium floride, potassium silicofluoride, potassium zirconate fluoride, zinc fluoride tetrahydrate, potassium fluoride, lithium fluoride, barium fluoride, tin fluoride, potassium fluoride, acidic potassium fluoride, magnesium fluoride, titanic fluoride, ammonium phosphate hexafluoride, potassium phosphate hexafluoride, etc.).

Preferred examples of the waxes include synthetic carbon hydride, modified waxes, hydrogenated waxes, natural waxes, etc.

Preferred examples of the synthetic carbon hydride include: polyethylene waxes such as commercially available under the tradenames of, for example, Polyron A, Polyron 393 and Polyron H-481 (Chukyo Oils & Fats Co., Ltd.), Sunwax E-310, Sunwax E-330, Sunwax E-250P, Sunwax LEL-250, Sunwax LEL-800 and Sunwax LEL-400P (Sanyo Chemical Industry Co. Ltd.); polypropylene waxes such as commercially available in the trade names of, for example, Viscol 330-P, Viscol 550-P and Viscol 660-P (Sanyo Chemical Industry Co., Ltd.); Fischer-Tropsch waxes such as commercially available under the tradenames of, for example, FT-100 and FT-0070 (Nippon Seiro Co., Ltd.); and acid amide compounds or acid imide compounds such as amide stearate and imide phthalic anhydride which are commercially available under the tradenames of, for example, Serozole 920, Serozole B495, Himicron G-270, Himicron G-110 and Hidrin D-757 (Chukyo Oils & Fats Co.).

Preferred examples of the modified waxes include: amine-modified polypropylene such as commercially available under the tradename of, for example, QN-7700 (Sanyo Chemical Industry Co., Ltd.); acrylic acid-modified waxes or fluorine-modified wax or olefin-modified wax; urethane type waxes such as commercially available under the tradenames of, for example, NPS-6010 and HAD-5090 (Nippon Seiro Co., Ltd.); and alcohol type waxes such as commercially available under the tradenames of, for example, NPS-9210, NPS-9215, OX-1949 and XO-020T (Nippon Seiro Co., Ltd.).

Preferred examples of the hydrogenated waxes include: hydrogenated castor oils such as commercially available under the tradename of, for example, Castor Wax (Ito Oil Manufacturing Co., Ltd.); derivatives of castor oils such as commercially available in the names of, for example, dehydrated castor oils DCO, DCO Z-1 and DCO-Z2, castor oil fatty acid CO-FA, ricinoleic acids, dehydrated castor oil fatty acid DCO-FA, dehydrated castor oil fatty acid epoxyester D4 ester, castor oil urethane acrylate CA-10, CA-20, CA-30, castor oil derivative MINERASOL S-74, MINERASOL S-80, MINERASOL S-203, MINERASOL S42X, MINERASOL S-321, special castor oil condensed fatty acid MINERASOL RC-2, MINERASOL RC-17, MINERASOL RC-55, MINERASOL RC-335, special castor oil condensed fatty acid ester MINERASOL LB-601, MINERASOL LB-603, MINERASOL LB-604, MINERASOL LB-702, MINERASOL LB-703, MINERASOL #11 and MINERASOL L-164 (Ito Oil Manufacturing Co., Ltd.); stearic acids such as 12-hydroxystearic acids (such as sold by Ito Oil Manufacturing Co., Ltd.); lauric acids; myristic acids; palmitic acids; behenic acids; sebacic acids (such as sold by Ito Oil Manufacturing Co., Ltd.); undecylenic acids (such as sold by Ito Oil Manufacturing Co., Ltd.); heptyl acids (such as sold by Ito Oil Manufacturing Co., Ltd.); maleic acids; higher maleic oils such as commercially available in the names of, for example, HIMALEIN DC-15, HIMALEIN LN-10, HIMALEIN OO-15, HIMALEIN DF-20 and HIMALEIN SF-20 (Ito Oil Manufacturing Co., Ltd.); blown oils such as commercially available in the names of, for example, Serbonol #10, Serbonol #30, Serbonol #60, Serbonol R-40 and Serbonol S-7 (Ito Oil Manufacturing Co., Ltd.); and cyclopentadiene oils such as commercially available in the names of, for example, CP Oil and CP Oil-S (Ito Oil Manufacturing Co., Ltd.).

The natural wax preferably comprises any one selected from a group of vegetable waxes, animal waxes, mineral waxes and petroleum waxes.

Preferred examples of the vegetable waxes include: carnauba waxes such as commercially available under the tradename of, for example, EMUSTAR-0413 (Ito Oil Manufacturing Co., Ltd.), and Serozole 524 (Chukyo Oils & Fats Co., Ltd.); castor oils (such as sold Ito Oil Manufacturing Co.); colza oils; soybean oils, sumac waxes; cotton waxes; rice waxes; sugarcane waxes; canderyla waxes; Japan waxes; and jojoba oils. Among them, the carnauba waxes, that have melting temperatures in a range of from 70° to 95° C., are especially preferred in terms of providing the electrophotographic image receiving sheet that excels in offset resistance, adhesion resistance, transport qualities to pass though electrophotographic equipments, glossy impression, toughness against cracks, and capability for forming a high quality image.

Preferred examples of the animal waxes include lanolin, spermaceti waxes, blubber oils and wool waxes.

Preferred examples of the mineral waxes include: montan waxes; montan ester waxes; ozokerite; ceresin; fatty acid ester such as commercially available under the tradenames of, for example, Sensosizer DOA, Sensosizer AN-800, Sensosizer DINA, Sensosizer DIDA, Sensosizer DOZ, Sensosizer DOS, Sensosizer TOTM, Sensosizer TITM, Sensosizer E-PS, Sensosizer nE-PS, Sensosizer E-PO, Sensosizer E-4030, Sensosizer E-6000, Sensosizer E-2000H, Sensosizer E-9000H, Sensosizer TCP and Sensosizer C-1100 (Chukyo Oils & Fats Co., Ltd.), etc. Among them, the montan waxes, that have melting temperatures in a range of from 70° to 95° C., are especially preferred in terms of providing the electrophotographic image receiving sheet that excels in offset resistance, adhesion resistance, transport qualities, glossy impression, toughness against cracks, and capability for forming a high quality image.

Preferred examples of the petroleum waxes include: paraffin waxes such as commercially available under the tradenames of, for example, Paraffin Wax 155, 150, 140, 135, 130, 125, 120, 115, NHP-3, NHP-5, NHP-9, NHP-10, NHP-11, NHP-12, NHP-15g, SP-0160, SP-0145, SP-1040, SP-1035, SP-3040, SP-3035, NPS-8070, NPS-L-70, OX-2151, OX2251, EMUSTAR-0384 and EMUSTAR-0136 (Nippon Seiro Co., Ltd.), Serozole 686, Serozole 651-A, Serozole A, Serozole H-803, Serozole B-460, Serozole E-172, Serozole 866, Serozole K-133, Hidrin D-337 and Hidrin E-139 (Chukyo Oils & Fats Co., Ltd.), 125° Paraffin, 125° FD, 130° Paraffin, 135° Paraffin, 135° H Paraffin, 140° Paraffin, 140° N Paraffin, 145° Paraffin and Paraffin Wax M (Nisseki Mitsubishi Oil Co., Ltd.); microcrystalline waxes such as commercially available under the tradenames of, for example, Hi-Mic-2095, Hi-Mic-3090, Hi-Mic-1080, Hi-Mic-1070, Hi-Mic-2065, Hi-Mic-1045, Hi-Mic-2045, EMUSTAR-0001 and EMUSTAR-042X (Nippon Seiro Co., Ltd.), Serozole 967 and Serozole M (Chukyo Oils & Fats Co., Ltd.), 155 Microwax and 180 Microwax (Nisseki Mitsubishi Oil Co., Ltd.); and petrolatum such as commercially available under the tradenames of, for example, OX-1749, OX-0450, OX-0650B, OX-0153, OX-261BN, OX-0851, OX-0550, OX-0750B, JP-1500, JP-056R and JP-011P (Nippon Seiro Co., Ltd.).

The natural wax content of the toner image receiving layer (surface layer) should preferably be in a range of from 0.1 to 4 $g/m^2$, and more preferably in a range of from 0.2 to 2 $g/m^2$. If the natural wax content is less than 0.1 $g/m^2$, significant deterioration of, in particular, offset resistance and adhesion resistance will occur. On the other hand, if the natural wax content is beyond 4 $g/m^2$, the amount of wax is too large to form a high quality image. The natural wax should have a melting temperature preferably in a range of from 70° to 95° C., and more preferably in a range of from 75° to 90° C., in light of, in particular, offset resistance and pass-though ability to pass though electrophotographic equipments.

Examples of the matting agents include various materials conventionally known in the art. Solid particles used for the matting agent are classified into two types, namely inorganic particles and organic particles. Preferred materials for the inorganic matting particles include: oxides such as a silica dioxide, a titanium oxide, a magnesium oxide and an aluminum oxide; salts of alkaline earth metal such as barium sulfate, calcium carbonate and magnesium sulfate; silver halides such as a silver chloride and silver bromide; and glass.

More specifically, preferred examples of the inorganic matting agents include those disclose in West Germany Patent No. 2,529,321, British Patent Nos. 760775 and 1,260,772, U.S. Pat. Nos. 1,201,905, 2,192,241, 3,053,662, 3,062,649, 3,257,206, 3,322,555, 3,353,958, 3,370,951, 3,411,907, 3,437,484, 3,523,022, 3,615,554, 3,635,714, 3,769,020, 4,021,245 and 4,029,504.

Preferred materials for the organic matting agents include: starches; cellulose ester such as cellulose acetate propionate; cellulose ether such as ethyl cellulose; and synthetic resins. The synthetic resins are preferably of a water-insoluble type or of a hardly soluble type. Preferred examples of the synthetic resins, water-insoluble or hardly soluble, include: poly(meth)acrylic ester such as polyalkyl(metha)-acrylate, polyalkoxyalkyl(meth)acrylate, polyglycidyl(meth)acrylate); poly(meth)-acrylamide; polyvinyl ester such as polyvinyl acetate; polyacrylonitrile; polyolefin such as polyethylene; polystyrene; benzoguanamine resins; formaldehyde condensed polymers; epoxy resins; polyamide; polycarbonate; phenol resins; polyvinyl carbazole; polyvinyliden chloride; etc.

Copolymers comprising a combination of monomers used for the above mentioned polymers may be used. In the case of using such a copolymer, the copolymer may contain a small chain of hydrophilic repeating units. Examples of the monomers forming a hydrophilic repeating unit include: acrylic acids, methacrylic acids, α-unsaturated carboxylic acids, β-unsaturated carboxylic acids, hydroxyalkyl(meth)-acrylate, sulfoalkyl(meth) acrylate and styrene sulfonate.

Examples of the organic matting agents include those enumerated in British Patent No. 1,055,713, U.S. Pat. Nos. 1,939,213, 2,221,873, 2,268,662, 2,322,037, 2,376,005, 2,391,181, 2,701,245, 2,992,101, 3,079,257, 3,262,782, 3,443,946, 3,516,832, 3,539,344, 3,591,397, 3,754,924 and 3,767,448, and Japanese Unexamined Patent Publication Nos. 49(1974)-106821 and 57(1982)14835. These solid particles may be used individually or in any combination of two or more. The average particle size should be preferably in a range of from 1 to 100 μm, and more preferably in a range of from 4 to 30 μm. The amount of used solid particles should be preferably in a range of from 0.01 to 0.5 $g/m^2$, and more preferably in a range of from 0.02 to 0.3 $g/m^2$.

Derivatives, oxides, refined products or mixtures of these solid particles may be used as the releasing agent that is added to the toner image receiving layer. Further, they may have a reactive substituent. The releasing agent should have a melting temperature preferably in a range of from 70° to 95° C., and more preferably in a range of from 75° to 90° C., in terms of providing the electrophotographic image receiving sheet that excels in offset resistance and pass-though ability to pass though electrophotographic equipments. The content of releasing agent should be preferably in a range of from 0.1 to 10% by mass, more preferably in a range of from 0.3 to 8.0% by mass, and most preferably in a range of from 0.5 to 5.0% by mass, with respect to the total amount of toner image receiving layer.

-Plasticizing Agent-

Various conventional plasticizing agents for resins can be used without any particular restrictions. The plasticizing agents have the function of regulating fluidization or unstiffening of the toner image receiving layer due to heat and/or pressure applied in the toner fixing process. The plasticizing agents may be selected consulting "Handbook Of Chemistry" (Chemical Society of Japan) published by Maruzen; "Plasticizer—Theory and Applications—"(Kouichi Murai) published by Koushobou; "Study On Plasticizer Vol. 1" and "Study On Plasticizer Vol. 2" (Polymer Chemistry Association); "Handbook: Rubber•Plastics Compounding Chemicals" (Rubber Digest Ltd.); etc.

Available as the plasticizing agents are: esters such as phthalate esters, phosphate fatty esters, abietate esters, adipate esters, sebacate esters, azelate esters, benzoate esters, butyrate esters, epoxidized fatty esters, glycolate esters, propionate esters, trimellitate esters, citrate esters, sulfonate esters, calboxylate esters, succinate esters, maleate esters, fumarate esters, stearate estes, etc.; amides such as fatty amides, sulfoamides, etc.; ether; alcohol; lactone; polyethyleneoxy; and the like. These plasticizing agents are enumerated in, for example, Japanese Unexamined Patent Publication Nos. 59(1984)-83154, 59(1984)-178451, 59(1984)-178453, 59(1984)-178454, 59(1984)-178455, 59(1984)-178457, 61(1986)-209444, 61(1986)-2000538, 62(1987)-174745, 62(1987)-245253, 62(1987)-8145, 62(1987)-9348, 62(1987)-30247, 62(1987)-136646, and 2(1990)-235694.

Polymers of comparatively low molecular weight may be used as the plasticizing agents. The molecular weight of plasticizing agent is preferably lower than the molecular weight of the binder resin to be plasticized. More specifically, the molecular weight of plasticizing agent should preferably be lower than 15000, and more preferably lower than 5000. The polymer plasticizing agent is preferred to comprise the same polymer as the binder resin. For example, low molecular weight polyesters are preferred for plasticizing the polyester resin. Further, oligomers may be used as the plasticizing agents.

There are various plasticizing agents other than the above mentioned compounds such as commercially available under the trade names of, for example: Adecasizer PN-170, Adecasizer PN-1430 (Asahi Denka Kogyo K.K.); PARAPLEX-G-25, PARAPLEX-G-30, PARAPLEX-G-40 (HALL Corporation); and Estergum 8L-JA, Ester R-95, Pentaryn 4851, Pentaryn FK115, Pentaryn 4820, Pentaryn 830, Ruizol 28-JA, Picorastic A75, Picotex LC, Crystalex 3085 (Rika Hercules Co., Ltd.); etc.

It is possible to make arbitrary use of the plasticizing agents in order to alleviate stress or strain (physical strain due to elastic force or viscosity, strain due to material balance of molecules, main chains and pendants) that occurs when toner particles are buried in the toner image receiving layer. The plasticizing agent may be present in the toner image receiving layer in a microscopically dispersed state, a microscopically phase separated state like a "sea-island" pattern or a state where the plasticizing agent has mixed with and dissolved in other components such as a binder sufficiently. The content of plasticizing agent should preferably be in a range of from 0.001 to 90% by mass, more preferably in a range of from 0.1 to 60% by mass, and most preferably in a range of from 1 to 40% by mass, with respect to the total amount of toner image receiving layer. The plasticizing agent may be further utilized for the purpose of optimizing competence to slip (improved sliding mobility due to a reduction in frictional force), offset of a fixing area (separation of a toner layer to the fixing area), a curling balance and static build-up (formation of electrostatic toner image).

-Coloring Agent-

Preferred examples of the coloring agent include fluorescent brightening agents, white pigments, colored pigments, dyes, etc. The fluorescent brightening agents are compounds that have absorptive power in a near-ultraviolet range and generates fluorescence in a range of from 400 to 500 nm. A number of conventional fluorescent coloring agents can be used without being particularly bounded by types. Preferred examples of the fluorescent brightening agent include compounds enumerated in "The Chemistry of Synthetic Dyes" (K. Veen Ratarman), Vol. V, Chapter 8. More specific examples of the compound include stilbene compounds, coumarin compounds, biphenyl compounds, benzooxazoline compounds, naphthalimide compounds, pylazorine compounds, carbostyryl compounds, etc. There are various compound such as commercially available under the trade names of, for example: White Fulfa PSN, White Fulfa PHR, White Fulfa HCS, White Fulfa PCS, White Fulfa B (Sumitomo Chemical Co., Ltd.) UVITEX-OB (Chiba-Geigy Ltd.); etc.

Preferred examples of the white pigments include: inorganic pigments such as titanium oxides, calcium carbonate, etc. which will be described later in connection with fillers. Preferred examples of the colored pigments include: the pigments enumerated in, for example, Japanese Unexamined Patent Publication No. 63-44653; azoic pigments, for example, azoake pigments such as carmine 6B and red 2B, insoluble azo pigments such as monoazo yellow, disazo yellow, pyrazolo orange and Balkan orange, condensed type azo pigments such as chromophthal yellow and chromophthal red, polycyclic pigments, for example, phthalocyanine type pigments such as copper phthalocyanine blue and copper phthalocyanine green, dioxazine type pigments such as dioxazine violet, isoindolynone type pigments such as indolynone yellow, slen type pigments such as perylene, perynon, flavantron and thioindigo; lake pigments such as malachite green, rhodamine B, rhodamine G and Victoria blue B; inorganic pigments, for example, oxides such as titanium dioxides and colcothar, sulfates such as precipitated barium sulfates, carbonates such as precipitated calcium carbonates, silicates such as hydrated silicates and anhydrous silicates, metal powders such as aluminum powder, bronze powder, blue powder, carbon black, chrome yellow, iron blue; and the like. These colored pigments may be used individually or in any combination of two or more. Among the pigments, the titanium oxides are most preferred.

Various conventional dyes can be used as the coloring agents. Preferred examples of the oil-soluble dyes include anthraquinone compounds and azo compounds. Preferred examples of the water-insoluble dye include: vat dyes such as C.I. Vat violet 1, C.I. Vat violet 2, C.I. Vat violet 9, C.I. Vat violet 13, C.I. Vat violet 21, C.I. Vat blue 1, C.I. Vat blue 3, C.I. Vat blue 4, C.I. Vat blue 6, C.I. Vat blue 14, C.I. Vat blue 20, C.I. Vat blue 35 and the like; disperse dyes such as C.I. disperse violet 1, C.I. disperse violet 4, C.I. disperse violet 10, C.I. disperse blue 3, C.I. disperse blue 7, C.I. disperse blue 58 and the like; and oil-soluble dyes such as C.I. solvent violet 13, C.I. solvent violet 14, C.I. solvent violet 21, C.I. solvent violet 27, C.I. solvent blue 11, C.I. solvent blue 12, C.I. solvent blue 25, C.I. solvent blue 55 and the like. Colored couplers used in silver salt photography can be preferably utilized.

The content of color agent should preferably be in a range of from 0.1 to 8 g/m$^2$, and more preferably in a range of from 0.5 to 5 g/m$^2$, with respect to the toner image receiving layer (surface). If the content of coloring agent is less than 0.1 μm$^2$, the toner image receiving layer has a light transmittance too high. On the other hand, if the content of coloring agent content is beyond 8 g/m$^2$, the toner image receiving layer is apt to become poor in tractability against adhesion resistance and cracks.

-Filler-

Preferred examples of the filler include organic fillers, inorganic fillers and those that have been known as stiffeners, loading materials or reinforcing materials for binder resins. The filler can be selected consulting "Handbook: Rubber•Plastics Composing Chemicals" (Rubber Digest Ltd.), "New Edition Plastic Composing Chemicals—Fundamentals And Applications" (Taiseisha), or "Filler Handbook" (Taiseisha). Preferred examples of the inorganic fillers or pigments include silica, alumina, titanium dioxides, zinc oxides, zirconium oxides, iron oxides like mica, zinc white, lead oxides, cobalt oxides, strontium chromate, molybdenum pigments, smectite, magnesium oxides, calcium oxides, calcium carbonates, mullite, etc. Among these fillers, silica or alumina is particularly preferred. These fillers may be used individually or in combination of two or more. The filler desirably comprises smaller size particulates. If the particle size of the filler is large, the toner image receiving layer is apt to have a coarse surface.

There are two types of silica particles available for the filler, i.e. globular silica particles and amorphous silica particles. These silica can be synthesized in a wet process or a dry process or an aerogel process. Surfaces of hydrophobic silica particles may be treated with a trimethylsilyl group or silicon. In this case, it is preferred to use colloidal silica particles. The average particle size of the silica particles should preferably be in a range of from 200 to 5000 nm. Further, it is preferable to use porous silica particles. The average particle size of the porous silica particles should preferably be in a range of from 4 to 120 nm, and more preferably in a range of from 4 to 90 nm. The average pour volume per unit mass should preferably be in a range of from 0.5 to 3 ml/g.

There are two types of alumina available for the filler, i.e. anhydrous alumina and alumina hydrates. The anhydrous alumina may be of a crystal form of α, β, γ, δ, ζ, η, θ, κ, ρ or χ. The anhydrous alumina is more preferable rather than the alumina hydrates. Preferred examples of the alumina hydrates are monohydrates such as pseudoboemite, boemite and diaspore, or trihydrates such as gibbsite and bayerite. The average particle size of the alumina particles is preferably in a range of from 4 to 300 nm, and more preferably in a range of from 4 to 200 nm. The alumina particles are preferable to be porous. The average pore size of the porous alumina particles should preferably be in a range of from 50 to 500 nm, and the average pour volume per unit mass should preferably be in a range of from 0.3 to 3 ml/g.

The alumina hydrates can be synthesized in a sol-gel process in which alumina is precipitated by adding ammonia in a solution of aluminium or a hydrolysis process in which an aluminate alkali is hydrolyzed. The anhydrous alumina can be derived by heating and dehydrating an alumina hydrate.

It is preferred to add the filler in a range of from 5 to 2000 parts by dry mass relative to 100 parts by dry mass of a binder of the toner image receiving layer to which the filler is added.

-Cross-Linking Agent-

The cross-linking agent may be added in order to adjust storage stability and thermoplasticity of the toner image receiving layer. Examples for the cross-linking agent include compounds that have two or more reactive groups such as epoxy groups, isocyanate groups, aldehyde groups, active halogen groups, active methylene groups, acetylene groups or conventionally well known reactive groups, in one molecule. In addition, compounds having two or more reactive groups capable of forming a bonding through an ionic bond, a hydrogen bond, a coordinate bond, etc. may be used. Preferred examples of the cross-linking agents include compounds conventionally known as coupling agents, hardening agents, polymerizing agents, polymerization promoters, coagulating agents, film forming ingredients, auxiliary film forming ingredients and the like for resins. Specifically, preferred examples of the coupling agents include chlorosilane, vinylsilane, epoxysilane, aminosilane, alkoxyaluminum chelate, titanate coupling agents and those enumerated in "Handbook: Rubber•Plastics Compounding Chemicals" (Rubber Digest Ltd.).

-Electrostatic Charge Control Agent-

It is preferred for the toner image receiving layer to contain an antistatic or electrostatic charge adjusting agent in order to adjust toner transfer and toner adhesion and to prevent toner image receiving layers from adhering to each other due to electrostatic charges. Various types of electrostatic charge adjusting agents conventionally known in the art can be used. Preferred examples of the electrostatic charge adjusting agents include, but not limited to, surface-active agents such as cation surface-active agents, anion type surface-active agents, ampholytic surface-active agents, nonionic type surface-active agents and the like, and, in addition, polyelectrolytes, electroconductive metal oxides and the like. More specifically, preferred examples of the electrostatic charge adjusting agents include, but not limited to, cation type antistatic agents such as a quaternary ammonium salt, a polyamine derivative, cation-modified polymethylmethacrylate, cation-modified polystyrene and the like; anion type antistatic agents such as alkylphosphate, anion polymers and the like; and nonion type antistatic agents such as fatty ester, polyethylene oxides and the like. In the case where toner is charged with negative electricity, the cation type antistatic agent or the nonion type antistatic agent are preferred.

Preferred examples of the electroconductive metal oxides include ZnO, $TiO_2$, $SnO_2$, $Al_2O_3$, $In_2O_3$, $SiO_2$, MgO, BaO, $MoO_3$, etc. These electroconductive metal oxides may be used individually or in the form of complex oxide thereof. The metal oxide may further be doped or contain with a hetero element. For example, ZnO may be doped with Al or In; $TiO_2$ may be doped with Nb or Ta; and $SnO_2$ may be doped with Sb, Nb or halogen.

-Other Additives-

The material for the toner image receiving layer may contain various additives in order to improve the stability of a toner image and the stability of the image receiving layer. Preferred examples of the additives include antioxidants, anti-aging agents, anti-degradation agents, anti-ozonants, ultraviolet absorption agents, metal complexes, light stabilizers, antiseptic agents, fungicidal agents which are well known in the art.

Preferred examples of the antioxidants include chroman compounds, coumaran compounds, phenolic compounds such as hindered phenol, hydroquinone derivatives, hindered amine derivatives, spiroindan compounds, etc. The antioxidants that are enumerated in, for example, Japanese Unexamined Patent Publication No. 61(1986)-159644 can be use.

The anti-aging agents can be selected consulting "Handbook: Rubber•Plastics Compounding Chemicals $2^{nd}$ Revised Edition" (1993, Rubber Digest Ltd.).

Preferred examples of the ultraviolet absorption agents include: benzotriazole compounds such as enumerated in U.S. Pat. No. 3,533,794; 4-thiazolidone compounds such as enumerated in U.S. Pat. No. 3,352,681; benzophenone compounds such as enumerated in Japanese Unexamined Patent Publication No. 46(1971)-2784; ultraviolet absorption polymers such as enumerated in Japanese Unexamined Patent Publication No. 62(1987)-260152; etc.

Preferred examples of the metal complexes include those enumerated in, for example, U.S. Pat. Nos. 4,241,155, 4,245,018 and 4,254,195, Japanese Unexamined Patent Publication Nos. 61(1986)-88256, 62(1987)-174741, 63(1988)-199428, 1(1989)-75568 and 1(1989)-74272. In addition, ultraviolet absorption agents and light stabilizers that are enumerated in "Handbook: Rubber•Plastics Composing Chemicals $2^{nd}$ Revised Edition" (1993, Rubber Digest Ltd.), pages 122-137 are preferably used.

Various additives conventionally used in the photographic art may be added to the material for the toner image receiving layer. Preferred examples of the photographic additive include those enumerated in Research Disclosure (RD) Nos. 17643 (December 1978), 18716 (November 1979) and 307105 (November 1989). These additives appear at pages listed below:

| Additive | RD No. 17643 | RD No. 18716 | RD No. 307105 |
|---|---|---|---|
| 1. Brightener | 24 | 648R | 868 |
| 2. Stabilizer | 24-25 | 649R | 868-870 |
| 3. Light Absorbent (UV Absorbent) | 25-26 | 649R | 873 |
| 4. Color Image Stabilizer | 25 | 650R | 872 |
| 5. Film Hardener | 26 | 651L | 874-875 |
| 6. Binder | 26 | 651L | 873-874 |
| 7. Plasticizer/Lubricant | 27 | 650R | 876 |
| 8. Coating Auxiliary Agent (Surface-active agent) | 26-27 | 650R | 875-876 |
| 9. Antistatic Agent | 27 | 650R | 976-977 |
| 10. Matting Agent | | | 878-879 |

-Solid State Properties of Toner Image Receiving Layer-

The dry mass of the toner image receiving layer should preferably be in a range of from 1 to 20 g/m², and more desirably in a range of from 4 to 15 g/m², and the dry thickness should preferably be in a range of from 1 to 30 μm, and more preferably in a range of from 2 to 20 μm, but not limited to the range.

The toner image receiving layer should have a high degree of whiteness, specifically higher than 85% when estimated by the measuring method meeting JIS P8123 and a spectral reflection coefficient higher than 85% in a wavelength range of from 440 to 640 nm and a difference between the highest and the lowest spectral reflection coefficient less than 5% in the same wavelength range. The toner image receiving layer should also have a spectral reflection coefficient higher than 85% in a wavelength range of from 400 to 700 nm and a difference between the highest and the lowest spectral reflection coefficient less than 5% in the same wavelength range.

More specifically, when specifying the degree of whiteness expressed in CIE 1976 (L*a*b*) color space, the toner image receiving layer should have an L* value preferably greater than 80, more preferably greater than 85 and most preferably greater than 90. The toner image receiving layer should have a color tincture of white that is desirable as neutral as possible and specifically a value $((a^*)^2+(b^*)^2)$ expressed in CIE 1976 (L*a*b*) color space less than 50, more desirably less than 18 and most desirably less than 5.

The toner image receiving layer should be highly glossy, and have a degree of 45-degree-glossiness preferably higher than 60, more preferably higher than 75, and most preferably higher than 90, over a range of from a white state (which refers to a state where no toner is applied to the toner image receiving layer) to a black state (which refers to a state where toner is applied to the image receiving layer at the maximum density). However, the highest degree of 45-degree-glossiness is preferably less than 110. If the degree of 45-degree-glossiness is beyond 110, the toner image receiving layer has a metallic luster surface leading to an undesirable image quality. The degree of glossiness can be estimated by the measuring method meeting JIS Z8741.

The toner image receiving layer should further have a high degree of smoothness, specifically, an arithmetic mean roughness (Ra) less than 3 μm, more preferably less than 1 μm, and most preferably less than 0.5 μm over a range of from the white state to the black state. The arithmetic mean roughness (Ra) can be estimated by the measuring method meeting JIS B0601, B0651 or B0652.

Further, the toner image receiving layer should satisfy at least one, more preferably two or more, and most preferably all, of the following solid state properties (1) to (8):

(1) The toner image receiving layer has a glass-transition temperature (Tg) desirably higher than 30° C., but within +20° C. from a glass-transition temperature of toner.

(2) The toner image receiving layer has a ½ melting temperature (T½) preferably in a range of from 60 to 200° C., and more preferably in a range of from 80 to 170° C. In this instance, the ½ melting temperature (T½) is measurements of temperature at a half of a piston travel between start and end points of melt-off of the toner image receiving layer at each specified temperature when heating the toner image receiving layer at a programmed uniform rate applying a specified extrusion load to the piston under specified circumstances after preheating it at an initial setting temperature of, for example, 50° C. for a standing time of 300 seconds.

(3) The toner image receiving layer has a melt-off start temperature (Tfb) in a range of from 40 to 200° C. but within +50° C. from a melt-off start temperature of toner.

(4) The toner image receiving layer has a temperature at which the toner image receiving layer attains viscosity of $1 \times 10^5$ cp higher more than 40° C. than that of toner.

(5) The toner image receiving layer has a storage elastic modulus (G') at a fixing temperature in a range of from $1 \times 10^2$ to $1 \times 10^5$ Pa and a loss elastic modulus (G") at the fixing temperature in a range of from $1 \times 10^2$ to $1 \times 10^5$ Pa (6) The toner image receiving layer has a loss tangent (G"/G') at the fixing temperature, which represents a ration of loss elastic modulus (G") to storage elastic modulus (G'), in a range of from 0.01 to 10.

(7) The toner image receiving layer has a storage elastic modulus (G') at a fixing temperature is in a range of from $-50$ Pa from a storage elastic modulus (G't) for toner at fixing temperature to $+2500$ Pa from the storage elastic modulus (G't).

(8) An angle of inclination of molten toner with respect to the toner image receiving layer is less than 50°, and especially less than 40°.

The aforementioned solid state property (1) can be estimated using a measuring device well known in the art as a differential scanning calorimeter (DSC). The aforementioned solid state properties (2) and (3) can be estimated on a tester such as a Flow Tester, Model CFT-500 or Model CFT-500D (Shimazu Corporation). The aforementioned solid state properties from (5) to (7) can be estimated using a rotational rheometer such as a Dynamic Analyzer, model RADII (Scientific Co., Ltd.). Further, the aforementioned solid state property (8) can be estimated by a method disclosed in, for example, Japanese Unexamined Patent publication No. 8-334916, using a contact angle measuring device such as sold by Kyowa Surface Chemistry Co., Ltd.

The toner image receiving layer should have a surface electrical resistance in a range of from $1 \times 10^6$ to $1 \times 10^{15}$ $\Omega/cm^2$ under the condition of a temperature of 25° C. and a relative humidity of 65%. If the lower limit surface electrical resistance of $1 \times 10^6$ $\Omega/cm^2$ is exceeded, this indicates that the amount of toner transferred to the toner image receiving layer is insufficient, then a toner image is apt to diminish in density. On the other hand, if the upper limit surface electrical resistance of $1 \times 10^{15}$ $\Omega/cm^2$ is exceeded, electrostatic charges are generated to much to transfer a sufficient amount of toner to the toner image receiving layer. This excessive electrostatic charge generation results in a low density of toner image and adhesion of dusts due to electrostatic charges built up during handling the elctrophotographic image receiving sheet. Further, the elctrophotographic image receiving sheet encounters miss-feed, double feed, generation of charge prints and partial absence of toner transfer.

In this instance, the surface electrical resistance can be estimated by the method meeting JIS K 6911 on a measuring device such as Model R8340 sold by Advantest Co., Ltd. Specifically, the electrical resistance is measured under the condition of a temperature of 20° C. and humidity of 65% after a lapse of one minute from impression of a voltage of 100 V on a sample after moisturizing the sample for more than 8 hours under the same condition.

The following description will be provided for constituent elements of the electriophotographic image receiving sheet other than the toner image receiving layer.

[Support]

The support comprises paper such as base paper, synthetic paper, synthetic resin sheets, coated paper, laminated paper, etc. The support may be of a single layer structure or may be a multilayer structure. Among them, the laminated paper coated with a polyolefin resin layer on one or both surfaces thereof is preferred in the terms of smoothed glossiness and elasticity.

-Base Paper-

Preferred examples of the base papers include, but not limited to, bond paper enumerated in "Fundamentals of Photographic Engineering-Silver Salt Photography-" pages 223-240, edited by Japanese Society of Photograph (Corona Co., Ltd.). Various raw materials used for the electropjotographic image receiving sheet that are known in the art are selectively used as appropriate. Preferred examples of the raw materials include, but not limited to: natural pulp such as softwood or coniferous tree pulp or hardwood or broad leaf tree pulp; synthetic pulp made of plastic resins such as polyethylene or polypropylene; and mixtures of natural pulp and synthetic pulp.

It is preferred to use bleached broadleaf tree kraft pulp (LBKP) as a raw material of the base paper in light of improving surface smoothness, stiffness and dimensional stability (curling property) all together in well balance at a sufficient level. It is allowed to use bleached needle leaved tree kraft pulp (NBKP) or broad leaf sulphite pulp (LBSP) as a row material of the base paper. Fibers of these pulp should have a weight-average fiber length preferably in a range of from 0.45 to 0.70 mm. A beater or a refiner can be used to beat the pulp. The pulp should have a freeness preferably in a range of from 200 to 440 ml, and more preferably in a range from 250 to 380 ml, in Canadian Standard Freeness (C.S.F).

A pulp slurry (which is referred to as a paper stock in some cases) attained by beating the pulp is allowed to be added with various additives such as loading materials, dry paper strength enhancing agents, sizing agents, wet paper strength enhancing agents, fixing agents, pH adjusters and other chemical conditioners or agents as appropriate.

Preferable examples of the loading materials include calcium carbonate, clay, kaolin, a white earth, talc, a titanium oxide, a diatom earth, barium sulfate, an aluminum hydroxide, a magnesium hydroxide, etc.

Preferable examples of the dry paper strength enhancing agents include cationic starches, cationix polyacrylamide, anionic polyacrylamide, amphoteric polyacrylamide, carboxy-modified polyvinyl alcohol, etc.

Preferable examples of the sizing agents include a fatty acid salt, rosin, a rosin derivative such as maleic rosin, paraffin wax, an alkylketene dimer, an alkenyl anhydrate succinic acid (ASA), an epoxidized fatty acid amide, etc.

Preferred examples of the wet paper strength enhancing agents include polyamine polyamide epichlorohydrin, a melamine resin, a urea resin, an epoxidized polyamide resin, etc.

Preferred examples of the fixing agents include: polyvalent metals salt such as aluminum sulfates and aluminum chloride; cationic polymers such as cationic starches; etc.

Preferred examples of the pH adjusters include caustic soda, sodium carbonates, etc.

Preferred examples of the other agents include deforming agents, dyes, slime controlling agents, etc. It is also allowed to add softening agents as appropriate. Preferred examples of the softening agents include those enumerated in "New Handbook For Paper Processing" pages 554 and 555 (1980 Edition by Paper Chemicals Times).

The base paper is processed for surface sizing with sizing solutions. Preferred examples of the sizing solutions include, but limited to, water-soluble polymeric compounds, water resistant materials, pigments, dyes, fluorescent brightening agents, etc.

Preferred examples of the water-soluble polymeric compounds include cationic starches, polyvinyl alcohol, carboxy-modified polyvinyl alcohol, acrboxymethyl cellulose, hydroxyethyl cellulose, cellulose sulfate, polyethylene oxides, gelatin, casein, sodium polyacrylate, a sodium salt of styrene-maleic anhydrate copolymer, polystyrene sulphonate sodium, etc. Among them are polyvinyl alcohol, it is preferable to employ carboxy-modified polyvinyl alcohol, acrboxymethyl cellulose, hydroxyethyl cellulose, cellulose sulfate, polyethylene oxides or gelatin, etc.

The base paper described above should have a Young's modulus ratio of longitudinal Young's modulus (Ea) relative to transversal Young's modulus (Eb) in a range of from 1.5 to 2.0 in light of improving stiffness and dimensional stability (curling property). If the Young's modulus ratio is out of the range, i.e. less than 1.5 or greater than 2.0, the electrophotographic image receiving sheet is apt to take on aggravation of stiffness and/or curling property and, in consequence, encounters aggravation of transport qualities during sheet transportation.

It has been known that "stiffness" of paper is different depending upon beating processes. Elastic force (elasticity) of paper made after beating can be employed as one of key factors representing the "stiffness" of paper. In particular, the elasticity of paper can be find by using the relationship between the dynamic modulus of elasticity representing a solid state property of paper as a visco-elasticic body and the density of paper and measuring the acoustic propagation velocity through paper by an ultrasonic transducer and is expressed by the following equation.

$$E = \rho c^2 (1 - n^2)$$

where E is the dynamic elastic coefficient;
$\rho$ is the paper density;
c is the acoustic propagation velocity through paper
n is Poisson's ratio.

Because Poisson's ratio n of ordinary paper is approximately 0.2 at the highest, the dynamic modulus of elasticity can be approximated by the following equation.

$$E = \rho c^2$$

That is, the modulus of elasticity is easily obtained in the event where the density of paper and the acoustic propagation velocity of paper. An acoustic propagation velocity of paper can be measured by an instrument well known in the art such as, for example, Sonic Tester, Model SST-110 sold by Nomura Co., Ltd.

In order to create a desired average surface roughness on a paper surface, it is preferred to use pulp fibers having a fiber length distribution as disclosed in, for example, Japanese Unexamined Patent Publication No.58-68037. Specifically, according to the distribution of fiber length, the pulp fibers should contain a total part of residual pulp fibers screened with a 24-mesh screen and residual pulp fibers screened with a 42 mesh screen in a range of from 20 to 45% by weight and a part of the residual pulp fibers screened with the 24-mesh screen less than 5% by weight The base paper can be adjusted in average surface roughness by a surface treatment with heat and pressure using a machine calender or a super calender.

The base paper should have a thickness preferably in, but not limited to, a range of from 30 to 500 µm, more preferably in a range of from 50 to 300 µm, and most preferably in a range of from 100 to 250 µm and should further have a basic weight preferably in, but not limited, a range of from 50 to 250 g/m$^2$, and more preferably in a range of from 100 to 200 g/m$^2$.

-Synthetic Paper-

The synthetic paper is paper comprises polymer fibers other than cellulose in major proportions. Preferred examples of the polymer fibers include polyolefin fibers such as polyethylene fibers and polypropylene fibers.

-Synthetic Resin Sheet (Film)-

The synthetic resin sheets or films are synthetic resins shaped in the form of sheet. Preferred examples of the synthetic resin sheets or films include polypropylene films, oriented polyethylene films, oriented polypropylene films, polyester films, oriented polyester films, nylon films, films tinged white through drawing, white films containing white pigments, etc.

-Coated Paper-

The coated paper is prepared by coating either or both surfaces of a base paper sheet with a material such as resins, rubber latex and polymeric materials. The amount of coating is different according to intended applications of the coated paper. Preferred examples of the coated papers include art paper, cast-coated paper, Yankee paper, etc. It is preferred to use thermoplastic resins as the coating material such as listed below:

(I) Polyolefin resins such as polyethylene resin and polypropylene resins; copolymer resins consisting of ethylene such as ethylene and polypropylene and other vinyl monomers; and acrylic resins.

(II) Thermoplastic resins having an ester bond such as, for example, polyester resins obtained resulting from condensation of a dicarboxylic acid component (which may be substituted with a sulfonic group or a carboxyl group) and an alcohol component (which may be substituted with a hydroxyl group); polyacrylic ester resin or polymethacrylic ester resin such as polymethyle methacrylate, polybutyl methacrylate, polymethyle acrylate or polybutyl acrylate; polycarbonate resins; polyvinyl acetate resins; styrene acrylic resins; styrene-methacrylic eater copolymer resins; vinyl toluene acrylic resins; etc. More specific examples of the thermoplastic resins are disclosed in, for example, Japanese Unexamined Patent Publications Nos. 59-101395, 60-294862, 63-7971, 63-7972 and 63-7973. Further, the thermoplastic resins are commercially available under the trade names of, for example, Vyron 103, Vyron 200, Vyron 280, Vyron 290, Vyron 300, Vyron GK-130 and Vyron GK-140 (Toyobo Co., Ltd.); Tafuton NE-382, Tafuton U-5, Tafuton ATR-2009 and Tafuton ATR-2010 (Kao Co., Ltd.); Elitel UE3500, Elitel UE3210, Elitel XA-8153, Elitel KZA-7049 and Elitel KZA-1449 (Unitika Ltd.); Polyester TP-220 and Polyester R-188 (Nippon Synthetic Chemical Industry Co., Ltd.); thermoplastic resins of Hyros series (Seiko Chemical Industry Co., Ltd.).

(III) Polyurethane resins, etc.
(IV) Polyamide resins, urea resins, etc.
(V) Polysulfone resins, etc.
(VI) Polyvinyl chloride resins, polyvinyliden chloride resins, vinyl chloride-vinyl acetate copolymer resins, vinyl chloride-vinyl propionate copolymer resins, etc.

(VII) Polyol resins such as polyvinyl butyral, cellulose resins such as ethyl cellulose resins and cellulose acetate resins, etc.
(VIII) Polycaprolactone resins, styrene-maleic anhydride resins, polyacrilonitrile resins, polyether resins, epoxy resins, phenolic resins, etc.

These thermoplastic resins may be used individually or in any combination of two or more.

It is allowed for each of the thermoplastic resins to contain brightening agents, conducting materials, loading materials and pigments or dyes such titanium oxides, ultramarine blue pigment and carbon black as appropriate.

-Laminated Paper-

A laminated paper sheet is prepared by laminating a base paper sheet with various resins, rubber, or polymeric sheets films. Specifically, Available laminating materials include polyolefin, polyvinyl chloride, polyethylene terephthalate, polystyrene, polymethacrylate, polycarbonate, polyimide, triacetylcellulose, etc. These laminating materials may be used individually or in any combination of two or more.

Generally, the polyolefin is often prepared by utilizing low density polyethylene and, preferably by utilizing polypropylene, blends of polypropylene and polyethylene, high density polyethylene, blends of high density polyethylene and low density polyethylene, etc. In particular, it is most preferred to employ blends of high density polyethylene and low density polyethylene in light of cost and adaptability to lamination. The blending ratio (mass ratio) of high density polyethylene to low density polyethylene is desirably between 1:9 and 9:1, more desirably between 2:8 and 8:2, and most desirably between 3:7 and 7:3. In the case where the opposite surfaces of the support sheet are coated with thermoplastic resins, it is preferred to employ, for example, high density polyethylene or a blend of high density polyethylene and low density polyethylene, for a coating layer of a rear surface of the electrophotographic image receiving sheet. In this instance, the polyethylene is not bound by molecular weight and is preferred to have a melt index in a range of 1.0 to 40 g/10 minutes regardless of higher density or low density as long as it has good extrusion adaptability. In this instance, these sheets or films may be treated so as to have white reflexivity. This treatment is achieved by blending pigments such as titanium oxides or the like in the sheet or the film.

The support sheet should have a thickness preferably between 25 and 300 μm, more preferably between 50 and 260 μm, and most preferably between 75 and 220 μm., and may have appropriate stiffness according to applications and, in the case of being incorporated in the electrophotographic image receiving sheet having silver salt photographic image qualities, should have stiffness similar to those for sliver salt color films.

[Other Layers]

Preferred examples of the other layers include a surface protective layer, a backing layer, a contact improvement layer, an intermediate layer, an under coating layer, a cushioning layer, an electrostatic charge adjusting or antistatic layer, a reflection layer, a color tincture adjusting layer, a storage stability improvement layer, an anti-adhesive layer, an anti-curling layer, a smoothing layer, etc. These layers may be single-layered or multi-layered.

-Surface Protective Layer-

The surface protective layer is formed over the surface of the toner image receiving layer for the purpose of protecting the surface thereof, improving storage stability, handling adaptability, creating writability, improving transport qualities to pass through printers or various equipments, creating anti-offset resistance, etc. The surface protective layer may be single-layered or multi-layered. Although various types of thermoplastic resin binders or thermosetting resin binders can be used for the surface protective layer, it is preferred to use the same resin binders as used for the toner image receiving layer. The binder of the surface protective layer is not always the same in thermodynamic and electrostatic characteristics as those of the toner image receiving layer and can be optimized as appropriate. The surface protective layer may be blended with various additives, for example the matting agents, together with the releasing agent used for the electrophotographic image receiving sheet. Commercially available matting agents known in the art may be employed.

It is preferred for the outermost layer of the electrophotoelectric image receiving sheet (e.g. the surface protective payer in the case where it is formed) to have high compatibility with toner in light of fixing performance. Specifically, it is preferred for the outermost layer to have a contact angle with molten toner in a range of, for example, from 0° to 40°.

-Backing Layer-

The backing layer is formed on the rear surface of the support sheet opposite to the toner image receiving layer for the purpose of creating printing adaptability of the rear surface of the electrophotographic image receiving sheet and improving rear image qualities, a curling balance and transport qualities. The backing layer is preferred to be, but not always limited to, white in the case where the electrophotographic image receiving sheet is of two-sided. The backing layer is preferred to have a degree of whiteness and a spectral reflecting coefficient both higher than 85% similarly to the toner image receiving layer.

In order to improve printing adaptability of both surfaces of the electrophotoelectric image receiving sheet, the backing layer may be similar in structure to the toner image receiving layer. Further, the backing layer may be blended with the same additives as described above such as, in particular, matting agents and electrostatic charge adjusting agents. The backing layer may be single-layered or malt-layered. In the case of using a releasing oil for the fixing rollers or the like, the backing layer may be of an oil absorbing type.

-Adhesion Improvement Layer-

The adhesion improvement layer is formed preferably between the toner image receiving layer and the support sheet of the electrophotogreaphic image receiving sheet for the purpose of improving close adhesion. The adhesion improvement layer may be blended with various additives including such as, in particular, cross-linking agents. Further, the cushioning layer is additionally formed preferably between the adhesion improvement layer and the toner image receiving layer for the purpose of improving toner acceptability.

-Intermediate Layer-

The intermediate layer may be formed, for example, between the support sheet and the adhesion improvement layer, between the adhesion improvement layer and the cushioning layer, between the cushioning layer and the toner image receiving layer, or between the toner image receiving layer and the storage stability improvement layer. In the case where the electrophotogreaphic image receiving sheet consists of the support sheet, the toner image receiving layer and the intermediate layer, it is of course to put the intermediate layer between the support sheet and the toner image receiving layer.

The electrophotogreaphic image receiving sheet should have a thickness preferably in, but limited to, a range of from 50 to 350 µm, and more preferably in a range of from 100 to 280 µm, as appropriate.

(Toner)

In use of the electrophotographic image receiving sheet for image printing or image copying, toner is accepted by the toner image receiving layer. The toner contains at least binder resins and coloring agents and, if needed, a releasing agent and other components.

-Binder Resins-

Preferred examples of the binder resins for toners include styrene type resins such as styrene and parachlorosthylene; vinyl ester type resins such as vinyl naphthalene, vinyl chloride, vinyl bromide, vinyl fluoride, vinyl acetate, vinyl propionate, vinyl benzoate and vinyl butarate; methylene aliphatic carboxylate ester type resins such as methyl acrylate, ethyl acrylate, n-butyl acrylate, isobutyl acrylate, dodecyl acrylate, n-octyl acrylate, 2-chloroethyl acrylate, phenyl acrylate, methyl α-chloroacrylate, methyl methacrylate, ethyl methacrylate and butyl methacrylate; vinyl nitrile type resins such as acrylonitrile, methacrylonitrile and acrylamide; vinyl ether type resins such as vinyl methyl ether, vinyl ethyl ether and vinyl isobutyl ether; N-vinyl compounds such as N-vinyl pyrrole, N-vinyl carbazole, N-vinyl indole and N-vinyl pyrrolidone; homopolymers or copolymers of vinyl monomers of vinyl carboxylate such as methacrylic acids, acrylic acids and cinnamic acids; and various types of polyester. These binder resins may be used in combination with various waxes. Among them, the same type of resin as used for the toner imager receiving layer is preferred.

-Coloring Agent-

Coloring agents that are used for ordinary toners can be used without any restrictions. Preferred examples of the coloring agents include various pigments such as carbon black, chrome yellow, Hansa yellow, benzidine yellow, slen yellow, quinoline yellow, permanent orange GTR, pyrazolone orange, Vulcan orange, Watchung red, permanent red, brilliant carmine 3B, brilliant carmine 6B, Deipon oil red, pyrazalone red, redole red, rhodamine B lake, lake red C, rose Bengal, aniline blue, ultramarine blue, Carco oil blue, methylene blue chloride, phthalocyanine blue, phthalocyanine green and malachite green oxalate; and various dyes such as acridine type dyes, xanthene type dyes, azoic type dyes, benzoquinone type dyes, axine type dyes, anthraquinone type dyes, thioindigo type dyes, dioxazine type dyes, thiazine type dyes, azomethine type dyes, indigo type dyes, thioindigo type dyes, phthalocyanine type dyes, aniline black type dyes, polymethine type dyes, triphenylmethane type dyes, diphenylmethane type dyes, thiazine type dyes, thiazole type dyes and xanthene type dyes.

These coloring agents may be used individually or in any combination of two or more. The coloring agent content of toner should preferably be in a range of from 2 to 8% by mass. The toner does not lose tinting power when the coloring agent content is higher than 2% by mass nor diminish transparency when the coloring agent content is lower than 8% by mass.

-Releasing Agent-

Although all types of waxes conventionally known in the art may be used for the releasing agents in principle, particularly effective examples of the releasing agents include higher crystalline polyethylene waxes having comparatively low molecular weight, Fischer-Tropsch waxes, amide waxes and polar waxes containing nitrogen such as urethane compounds. It is preferred for the polyethylene waxes to have a molecular weight less than 1000, and more preferably in a range of from 300 to 1000.

Compounds having urethane bonds are preferred because they keep themselves solid due to strong coagulation power of its polar group even though they have only small molecular weight and can be set to a higher melting temperature with respect to low molecular weight. It is preferred for the compounds to have molecular weight in a range of from 300 to 1000. Specifically, preferred examples of raw materials for the compounds include combinations of diisocyanate compounds and monoalcohol, combinations of monoisocyanate and monoalcohol, combinations of dialcohol and monoisocyanate, combinations of trialcohol and monoisocyanate, combination of triisocyanate and monoalcohol, and the like. In order to keep the compounds from having higher molecular weight, it is preferred to combine compounds of multifunctional groups and monofunctional groups and, additionally, it is important to have quantitatively equivalent functional groups.

Preferred examples of the monoisocyanate compounds for the raw materials include dodecyl isocyanate, phenyl isocyanate, derivatives of phenyl isocyanate, naphthyl isocyanate, hexyl isocyanate, benzyl isocyanate, butyl isocyanate, aryl isocyanate, etc. Preferred examples of the diisocyanate compounds for the raw materials include tolylene diisocyanate, 4,4'diphenyl methane diisocyanate, toluene diisocyanate, 1,3-phenylene diisocyanate, hexamethylene diisocyanate, 4-methyl-m-phenylene diisocyanate, isophorone diisocyanate, etc. Preferred examples of the monoalcohol for the raw materials include methanol, ethanol, propanol, butanol, pentanol, hexanol, heptanol and other general alcohol. Preferred examples of the dialcohol for the raw materials include, but not limited to, various glycol such as ethylene glycol, diethylene glycol, triethylene glycol, trimethylene glycol, etc. Preferred examples of the trialcohol include, but not limited to, trimethylol propane, triethylol propane, trimethanol ethane, etc.

Each of the urethane compounds may be blended with the toner together with a resin and/or a coloring agent like ordinary releasing agents so as to provide a mixed pulverized type of toner. When using the compound for toner in an emulsion polymerization-coagulation melting method, the compound is dispersed in water together with polyelectrolytes such as an ionic surface-active agent, a polymer acid and a polymer base, heated to a temperature higher than its melting temperature and sheared to particulates of less than 1 µm. A dispersion liquid of the releasing particulates can be blended with the toner together with a dispersion liquid of resin particulates and/or a liquid of coloring agent particulates.

-Other Components-

The toners may be blended with other components such as internal additives, electrostatic charge control agents, inorganic particulates, etc. Preferred examples of the internal additives include various magnetic materials: specifically metals such as ferrite, magnetite, reduced iron, cobalt, nickel, manganese, etc.; alloys of these metals; and compounds containing these metals. Preferred examples of the electrostatic charge control agents include dyes such as quaternary ammonium salt compounds, nigrosin compounds, complexes of aluminum, iron or chrome; and various triphenylmethane type pigments; which are ordinarily used as antistatic agents. In light of controlling ion strength which has an effect on stability of the toners during coagulation and melting or fusion, and reducing wastewater pollution, it is preferred to use electrostatic charge adjusting agents that are hardly dissolved in water. Preferred examples of the inorganic particulates include all of the conventional additives that are externally applied to surfaces of toner particles such as silica, alumina, titania, calcium carbonate, magnesium carbonate, tricalcium phosphate, etc. It is preferred to use them in the form of a dispersion with an ionic surface-active agent, polymer acid and/or a polymer base.

Surface-active agents may be used for the purpose of emulsion polymerization, seed polymerization, dispersion of pigment, dispersion of resin particles, dispersion of releasing agents, coagulation, and stabilization of them. Preferred examples of the surface-active agents include anion surface-active agents such as sulfate salt type surface-active agents, sulfonate type surface-active agents, phosphate type surface-active agents, soap type surface-active agents, etc.; cationic surface-active agents such as amine salt type surface-active agents, quaternary ammonium salt type surface-active agents, etc.; and nonionic surface-active agents such as polyethylene glycol type surface-active agents, surface-active agents of a type of alkylphenol ethylene oxide adduct, polyhydric alcohol type surface-active agents, etc. For dispersing these surface-active agents, it is possible to use popular dispersing machines such as rotary shearing type homogenizers, ball mills, sand mills and the like.

The toner may further contain external additives if needed. Preferred examples of the additives include inorganic particles such as $SiO_2$ particles, $TiO_2$ particles, $Al_2O_3$ particles, CuO particles, ZnO particles, $SnO_2$ particles, $Fe_2O_3$ particles, MgO particles, BaO particles, CaO particles, $K_2O$ particles, $NaO_2$ particles, $ZrO_2$ particles, $CaO.SiO_2$ particles, $K_2O$. $(TiO_2)_n$ particles, $Al_2O_3.2SiO_2$ particles, $CaCO_3$ particles, $MgCO_3$ particles, $BaSO_4$ particles or $MgSO_4$ particles; and organic particles such as fatty acid particles, particles of derivatives of fatty acids, metal acids of them, fluorocarbon resin particles, polyethylene resin particles and acrylic resin particles. It is preferred for these particles to have an average particle size in a range of from 0.01 to 5 μm, and more preferably in a range of from 0.1 to 2 μm.

Although various methods may be used to manufacture the toner, it is preferred to employ a method comprising the following processes (i) to (iii):
(i) A process of preparing a dispersion liquid of coagulated particles by forming the coagulated particles in a dispersion liquid of resin particles
(ii) A process of forming particulate-adhered coagulated particles by mixing a dispersion liquid of particulates to the dispersion liquid of coagulated particles
(iii) A process of forming toner particles by heating and melting the particulate-adhered coagulated particles.

-Solid State Properties-

The volumetric average particle size of toner particles is preferably in a range of from 0.5 to 10 μm. If the volumetric average particle size is smaller than 0.5 μm, the toner has adverse effects on its handling (replenishing and cleaning adaptability and flowability) and on particle productivity. On the other hand, if the volumetric average particle size exceeds 10 μm, the toner also has an adverse effect on image quality and resolution due to graininess and transferability.

It is preferred for the toner to have a volumetric average particle size distribution index (GSDv) equal to or less than 1.3 while satisfying the particle size requirement. It is further preferred for the toner to have a ratio (GSDv/GSDn) of a volumetric average particle size distribution index (GSDv) relative to a number average particle size distribution index (GSDn) equal to or greater than 0.9. In addition, it is preferred for the toner to have an average of the profile factor expressed by the following equation in a range of from 1.00 to 1.50 while satisfying the volumetric average particle size requirement.

$$\text{Profile factor} = (\pi \times L^2)/(4 \times S)$$

where L is the greatest size of toner particle and S is the projected area of toner particle.

When the toner satisfies the requirements as set forth above, the toner has an positive effect on image quality, in particular graininess and resolution of an image, prevents an occurrence of partial absence of toner transfer and/or an occurrence of blurred toner image, and is hardly apt to have an adverse effect on its handling adaptability even though the average particle size is insufficiently small. In this instance, it is preferred for the toner itself to have a storage elastic modulus (G') (that is measured with an angular frequency of 10 rad/sec) at a temperature of 150° C. in a range of from 10 to 200 Pa in light of improving image quality and preventing an occurrence of offset in the fixing process.

(Image Forming Method)

The following description will be directed to a method of forming an image on the electrophotographic image receiving sheet of the present invention. The image forming method according to an embodiment of the present invention comprises a process of forming a toner image on the electrophotographic image receiving sheet, a process of heating and applying pressure to the toner image using a fixing belt type smoothing machine provided with a heating and pressing device, a fixing belt and a cooling device and cooling and separating the electrophotographic image receiving sheet. Additional processes known in the art may be employed as appropriate.

-Toner Image Forming Process-

There is no restrictions to the toner image forming processes as long as toner image is formed on the electrophotographic image receiving sheet. Preferred examples of the toner image forming processes include any ordinary toner image forming process such as a direct transfer process in which a toner image is directly transferred onto an electrophotographic image receiving sheet from a development roller and an intermediate belt type transfer process in which a toner image is transferred onto an intermediate transfer belt first and then onto an electrophotographic image receiving sheet Among them, the intermediate belt type transfer process is preferred in light of environmental stability and an enhancement of image qualities.

-Fixing and Smoothing Process-

The fixing and smoothing process comprises a step of heating and applying pressure to a toner image using a fixing belt type smoothing machine provided with a heating and pressing device, a fixing belt and a cooling device and then and cooling and separating the electrophotographic image receiving sheet. The fixing and smoothing device may have a cooling and separating station and may be additionally provided with other devices as appropriate. Preferred examples of the heating and pressing device include, but not limited to, a pair of heating rollers, a combination of a heating roller and a pressure roller, etc. Preferred examples of the cooling device include, but not limited to, cooling devices capable of blowing cold air and adjusting a cooling temperature, heatsinks, etc. The cooling and separating station as used herein shall mean and refer, but not limited, to a position near a tension roller where the electrophotographic image receiving sheet is peeled away from the fixing belt with its own stiffness.

When bringing the electrophotographic image receiving sheet into contact with the heating and pressing device of the cooling and heating belt-fixing type smoothing device, it is preferred to apply pressure to the electrophotographic image receiving sheet. Although there is no particular limit to the pressing step, it is preferred to apply nip pressure preferably in a range of from 1 to 100 kg/cm$^2$, and more preferably from 5 to 30 kg/cm$^2$, to the electrophotographic image receiving sheet in light of water resisting properties, distinguished surface smoothness and satisfactory glossiness. Further, it is also preferred to heat the electrophotographic image receiving sheet to a temperature higher than a softening point of the thermoplastic resin of the toner image receiving layer that is preferably in a range of from 80 to 200° C. The cooling device is capable of cooling down the electrophotographic image receiving sheet to a temperature lower than 80° C. that is sufficiently low to solidify the thermoplastic resin of the toner image receiving layer, more preferably to a tempera in a range of from 20 to 80° C.

The fixing belt comprises a heat-resistant support film and a releasing layer formed on the heat-resistant support film. There is no limit to the support film as long as the support film has heat resistance. Preferred examples of materials for the support film polyimide (PI), polyethylene naphthalate (PEN), polyethylene telephthalate (PET), polyether ether ketone (PEEK), polyether sulfone (PES), polyether imide (PEI), polyparabanic acids (PPA), etc.

It is preferred to employ at least one selected from a group consisting of silicon rubber, fluorine rubber, fluorocarbon siloxane rubber, silicon resins and fluorine resins for the releasing layer. Among them, it is preferred to provide a fluorocarbon siloxane rubber layer formed on one surface of the fixing belt or to provide a silicon rubber layer formed on one surface of the fixing belt and a fluorocarbon siloxane rubber layer formed over the silicon rubber layer.

Preferred examples of the fluorocarbon siloxane rubber include those having at least either one of a perfluoroalkyl ether group and a perfluoroalkyl group in a principal chain and more preferably such as hardened products of fluorocarbon siloxane rubber compositions having he following components (A) to (D):

(A) Fluorocarbone polymers composed of fluorocarbon siloxane having recurring units expressed by the general formula (1) as described below as a principal component and having an aliphatic unsaturated group.

(B) At least either one of organopolysiloxane and fluorocarbon siloxane which have more than two ≡SiH groups in one molecule and have the content of ≡SiH group that is one to four times in molar quantity as much as the quantity of aliphatic unsaturated group in the fluorocarbon siloxane rubber composition.

(C) Filler.

(D) Effective quantity of catalyst.

The fluorocarbon siloxane having recurring units that is a principal component of the fluorocarbons polymers (A) is expressed by the following general formula (1):

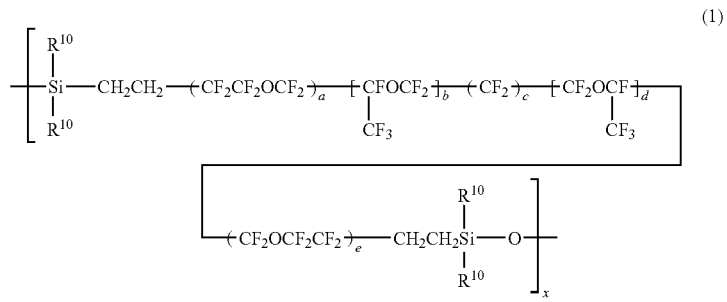

In the general formula (1), $R^{10}$ represents a substitutable or non-substitutable univalent hydrocarbon group having a carbon number between 1 and 8 such as desirably an alkyl group having a carbon number between 1 and 8 or an alkenyl group having a carbon number of 2 or 3, and more desirably a methyl group; a, and e represent an integer of 0 or 1, respectively; b and d represent an integer between 1 and 4; c represents 0 or an integer between 1 and 8; and x represents an integer of 1 or greater than 1, preferably between 10 and 30.

Preferred examples of the component (A) are polymers expressed by the following general formula (2):

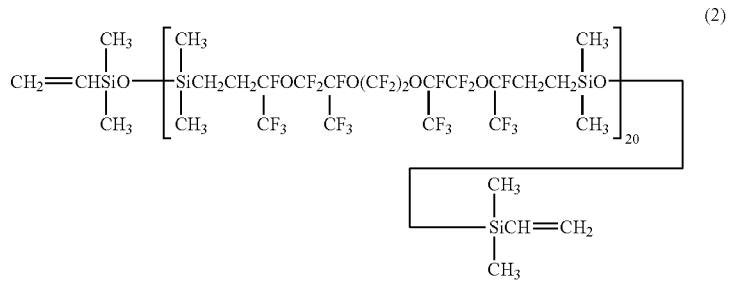

Preferred examples of the component (B), i.e. organopolysiloxane having ≡SiH groups, include organohydrogen polysiloxane having at least two hydrogen atoms bonded to silicon atoms in one molecule.

In the case where the fluorocarbons polymer of the component (A) has an aliphatic unsaturated hydrocarbon group, it is preferred to use hardening agents such as the organohydrogen polysiloxane to provide the hardened product of fluorocarbon siloxane rubber composition. That is, the hardened product of fluorocarbon siloxane rubber composition is produced through an addition reaction occurring between an aliphatic unsaturated hydrocarbon group of the fluorocarbon siloxane and an atom bonded to a silicon atom of the organohydrogen polysiloxane. Various organohydrogen the harden polysiloxane that are used for an addition hardening type silicon rubber composition can be used as ing agent. It is preferred for the organohydrogen polysiloxane to be compounded so as to contain at least one, desirably one to five, ≡SiH groups for one aliphatic unsaturated hydrocarbon group in the component (A) i.e. the fluorocarbon siloxan.

Preferred examples of the fluorocarbon having ≡SiH groups include the unit expressed by the general formula (1) or a unit having a dialkyl hydrogensiloxy group for $R^{10}$ of the general formula (I) and a ≡SiH group, e.g. a dialkylhydrogen siloxy group or a silyl group, for the end group which is expressed by the following general formula (3).

fixing belt may be coated with a coating liquid of the fluorocarbon siloxane rubber composition diluted with a solvent such as m-xylenehexafluoride or benzotrifluoride by a general coating process such as spray coating, dip coating or knife coating, as appropriate. Although the curing is not bound by temperature and time, it is preferred to cure the coating at a temperature in a range of from 100 to 500° C. for a curing time in a range of from 5 seconds to 5 hours according to types of the support film and belt manufacturing processes.

The thickness of the releasing layer of the fixing belt is preferably in, but not limited to, a range of from 1 to 200 μm, and more preferably a range of from 5 to 150 μm, in light of reliable toner image fixation resulting from enhanced peeling resistance of the toner and/or prevention of offset of the toner.

The following description will be directed to a typical electrophotographic image forming apparatus having a fixing belt with reference to FIG. 1.

At the beginning, toner particles 12 are transferred onto an electrophotographic image receiving sheet 1 from image forming means (not shown). Then, the electrophotographic image receiving sheet 1 with a toner image transferred thereto is transported to a position A by means of a conveyer device (not shown) and is passed through between a heating roller 14 and pressure roller 15. These rollers 14 and 15 heat and press the electrophotographic image receiving sheet 1 at a fixing

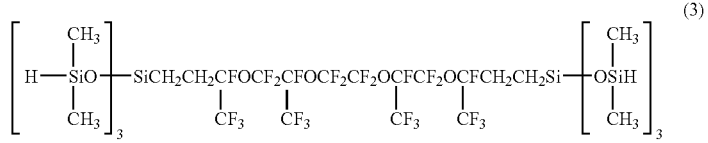

Preferred examples of the component (C) include various fillers that are conventionally used for general silicon rubber compositions: namely reinforcing fillers such as aerosol silica, precipitation silica, carbon powder, titanium dioxides, aluminum oxides, quartz powder, talc, sericite and bentonite, etc.; fiber fillers such an asbestos, glass fibers and organic fibers; etc.

Preferred examples of the catalyst for the component (D) include various catalysts for addition reaction known in the art such as chloroplatinic acids, alcohol-modified chloroplatinic acids, complexes of chloroplatinic acids and olefin, compositions of platinum black or palladium supported by alumina, silica or carbon, complexes of rhodium and olefin, elements of the VIII group of periodic table such as chlorotris (triphenylphosphine) rhodium (Wilkinson catalyst) and rhodium(III) acetylacetonate, compounds of these elements, etc. It is preferred to use the complexes as a solution with an alcohol solvent, an ether solvent or a hydrocarbon solvent.

The fluorocarbon siloxane rubber composition may be added with various compounding agents as appropriate. Preferred examples of the compounding agents include dispersing agents such as diphenylsilanediol, dimethylpolysiloxane with a low degree of polymarization that has a molecular chain ended with hydroxyl groups, hexamethyldisilazane, etc.; thermal resistance improving agents such as ferrous oxides, ferric oxides, cerium oxides, ferric octylate, etc.; and coloring agents such as pigments.

The fixing belt is preferably comprised by coating the heat-resistant support film with the fluorocarbon siloxane rubber composition and curing it with heat. Otherwise, the temperature and a pressure necessary and sufficient for softening the toner image receiving layer of the electrophotographic image receiving sheet for the toner particles 12. In this instance, the term "fixing temperature" as used herein shall mean and refer to the temperature of a surface of the toner image receiving layer of the electrophotographic image receiving sheet 1 measured at the position A where the rollers 14 and 15 nip at the electrophotographic image receiving sheet 1 and is preferably in a range of from 80° to 190° C., and more preferably in a range of from 100° to 170° C. The term "pressure" as used herein shall mean and refer to the pressure received by the surface of the toner image receiving layer of the electrophotographic image receiving sheet 1 measured at the position A and is preferably in a range of from 1 to 10 kgf/cm$^2$, and more preferably in a range of from 2 to 7 kgf/cm$^2$. While the electrophotographic image receiving sheet 1 after heated and pressed is transported toward a cooling device 16 by a fixing belt 13, the releasing agent discretely distributed in the toner image receiving layer is sufficiently heated to elute onto the surface of the toner image receiving layer. The eluted releasing agent forms a releasing layer or film on the surface of the toner image receiving layer.

Subsequently, the electrophotographic image receiving sheet is further transported to the cooling device 16 and is cooled to a temperature lower than a softening temperature of the binder resin used for the polymer of the toner image receiving layer and/or the binder resin used for the toner or a temperature not beyond 10° C. from their glass-transition temperatures, and more specifically, to a temperature preferably in a range of from 20° to 80° C., and more preferably to a room temperature of approximately 25° C. As a result, the releasing agent layer or film on the toner image receiving layer is cooled down and solidified. The electrophotographic image receiving sheet after cooling is further transported to a position B by the fixing belt 13 moving around a tension roller 17 and peels away from the fixing belt 13 in the position B. It is preferred for the tension roller to have a diameter sufficiently small so that the electrophotographic image receiving sheet peels away with its own stiffness (toughness).

Figure 2:
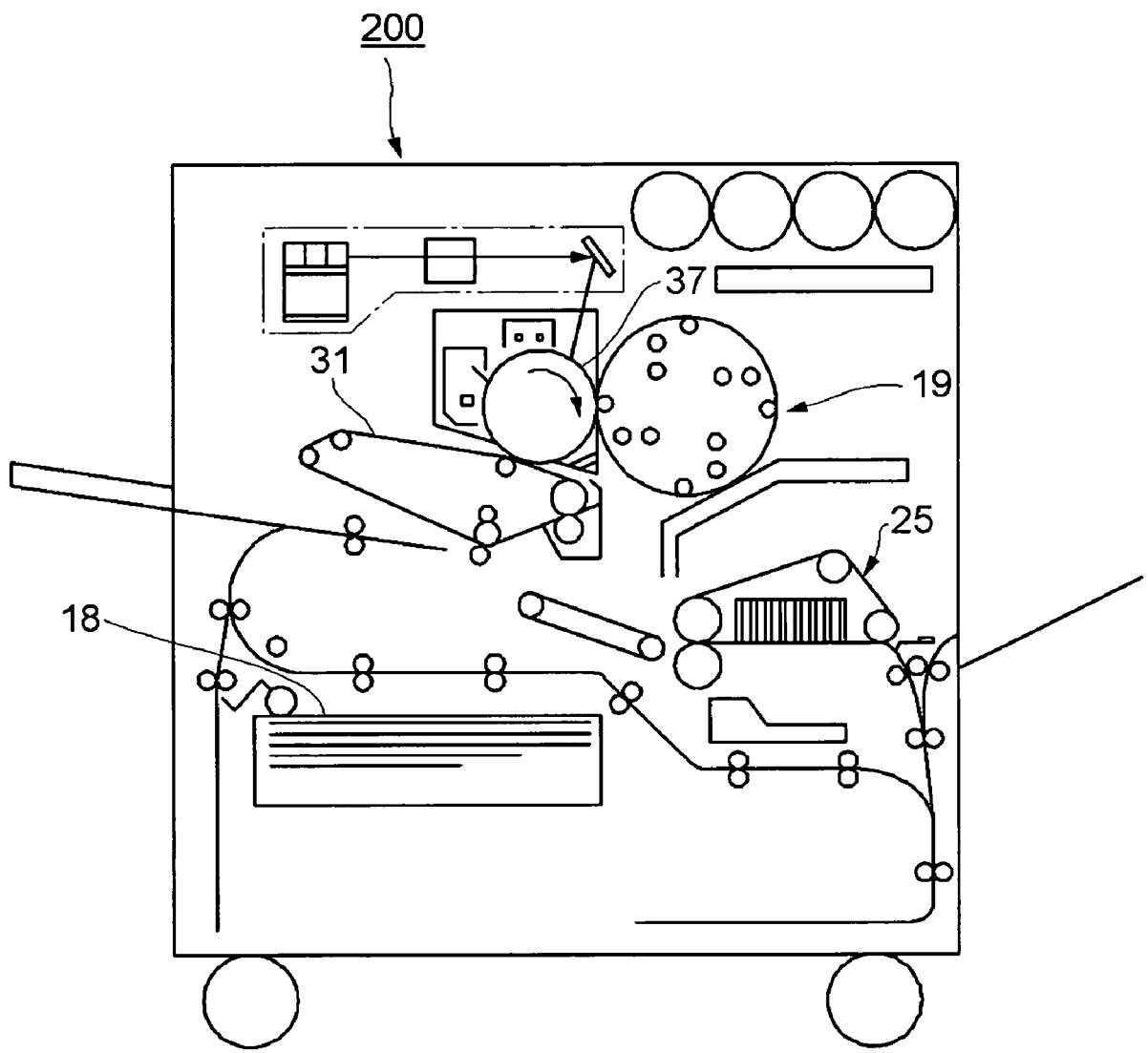
FIG. 2 is a schematic view showing an image forming machine for implementing the image forming method of the present invention by way of example.
Figure 3:
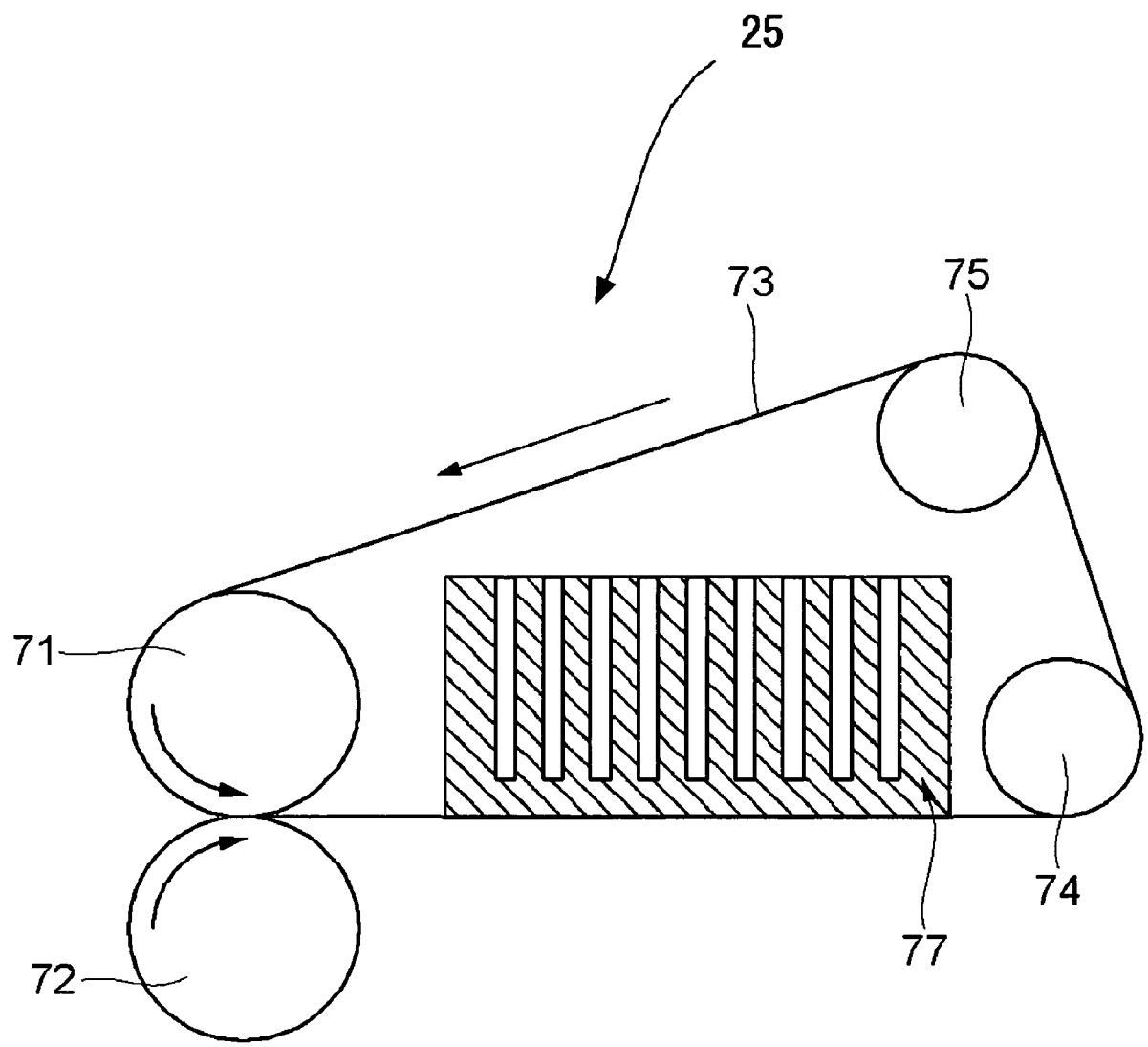
FIG. 3 is a schematic view showing a hot releasing-belt fixing type smoothing machine for implementing the image forming method of the present invention by way of example.

FIG. 2 schematically shows an electrophotographic machine 200 such as, for example, Full Color Laser Printer, Model DCC-500 (Fuji Xerox Co., Ltd.) equipped with a belt-fixing type smoothing device schematically shown in FIG. 3. The electrophotographic machine 200 comprises a photosensitive dram 37, a developing processor 19, an intermediate transfer belt 31, and a belt-fixing device 25 that is shown in more detail in FIG. 3.

As shown in FIG. 3, the belt-fixing device 25 comprises a heating roller 71, a peeling roller 74, a tension roller 75, an endless belt 73 mounted around these rollers 71, 74 and 75, a pressure roller 72 forced against the heating roller 71 through the endless belt 73, and a heatsink 77 disposed between the heating roller 71 and the peeling roller 74. The heatsink 77 forcibly cools the endless belt 73.

The electrophotographic image receiving sheet is transported by the endless belt 73 and cooled by the heat sink 77. More specifically, the electrophotographic image receiving sheet with a color toner image transferred and fixed thereto is introduced into a nip between the heating roller 71 and the pressure roller 72. During passing through between the heating roller 71 and the pressure roller 72, the color toner image is heated and fused at a temperature in a range of from 120° to 130° C. so as thereby to be fixed to the toner image receiving layer of the electrophotographic image receiving sheet. Thereafter, the electrophotographic image receiving sheet is transported by the endless belt 73 as the toner image receiving layer remains in contact with the endless belt 73. During the transportation, the color toner image transferred to the toner image receiving layer is cooled by the heat sink 77 so as thereby to be solidified. Then, when the electrophotographic image receiving sheet passes the peeling roller 74, it is peeled away from the endless belt 73 by the peeling roller 74 with the assistance of its own stiffness. After peeling away the electrophotographic image receiving sheet, the belt-fixing device 25 cleans the endless belt 73 so as to remove residual toner particles and dust from the belt surface for preparation for fixing operation of another electrophotographic image receiving sheet.

According to the image forming method of the present invention described above, even in the case that the electrophotographic image receiving sheet is processed with oilless type electrophotographic machines that need no fixing oil, the electrophotographic image receiving sheet is stably transported through the oilless type electrophotographic machine without encountering detriment to peel-off properties between the electrophotographic image receiving sheet and the toner or an occurrence of partial offset of the toner component and, simultaneously, provides high quality images, like silver salt photographic images, which are free from wet cracking and excellent in anti-adhesive property, anti-cracking property and glossiness.

The present invention will be described in connection with electrophotographic image receiving sheets by way of example.

-Preparation of Base Sheet-

Paper pulp for the base sheet was prepared by beating bleached broadleaf tree kraft pulp (LBKP) to a freeness of 300 ml (Canadian Standard Freeness: C.S.F) so as to adjust pulp fibers in fiber length to 0.6 mm with a disk refiner and then added with the following additives in the following proportions (% by mass) with respect to the mass of pulp.

| Additives | Mass % |
| --- | --- |
| Cation starch | 1.2 |
| Alkylketenedimer (AKD) | 0.5 |
| Anion polyacrylamide | 0.3 |
| Epoxidized fatty acid amine (EFA) | 0.2 |
| Polyamide polyamine epichlorohydrin | 0.3 |

In this instance, an alkyl component of the alkylketenedimer (AKD) is derived from fatty acid primarily composed of behenic acid and a fatty acid component of the epoxidized fatty acid amine (EFA) is derived from fatty acid primarily composed of behenic acid.

The pulp stock was processed to provide 150 g/m² by basic weight of base paper by a fourdrinier machine. During the processing, the pulp stock was adhered with 1.0 g/m² of polyvinyl alcohol (PVA) and 0.8 g/m² of $CaCl^2$ by a size press machine at an intermediate stage of a drying zone of the fourdrinier machine. At the end of paper making process, the base paper was adjusted in paper density to 1.01 g/m³ using a soft calender. The final base paper was passed through a metal roller at a surface temperature of 140° C. so as to keep one surface of the base paper on which a toner image receiving layer will be formed in contact with the metal roller. The base paper thus prepared had a whiteness of 91%, an Oken smoothness of 265 seconds and a Stockigt sizing degree of 127 seconds.

After processing the base paper with a colona discharge treatment with 17 kW output, a lamination layer of a polyethylene resin was formed on a rear surface of the base paper by single layer extrusion lamination. Specifically, a polyethylene resin having a composition indicated in Table I was extruded at a molten film discharge temperature of 320° C. and a discharge line speed of 250 m/min to form a polyethylene resin layer of 22 μm thick using a cooling roller having a surface mat roughness of 10 μm.

TABLE I

| Component | MFR (g/10 minutes) | Density (g/m³) | Amount (weight %) |
| --- | --- | --- | --- |
| HDPE | 12 | 0.967 | 70 |
| LDPE | 3.5 | 0.923 | 30 |

Thereafter, a lamination layer of a mixture of a polyethylene resin and an LDPE masterbatch ultramarine blue pigment was formed on the front surface of the base paper on which a toner image receiving layer will be formed by single layer extrusion lamination. The mixture was prepared by blending a polyethylene resin and an LDPE masterbatch ultramarine blue pigment which contains 5% by mass of masterbatch titanium oxide such as indicated in Table II so as to have the resultant composition indicated in Table III. Specifically, the mixture was extruded at a molten film discharge temperature of 320° C. and a discharge line speed of 250 m/min to form a single layer film of 29 μm thick using a cooling roller having a surface mat roughness of 0.7 μm.

TABLE II

| Component | Content (% by mass) |
|---|---|
| LDPE (ρ = 0.921 g/m$^3$) | 37.98 |
| Anatase type titanium dioxide | 60 |
| Zinc stearate | 2 |
| Antioxidant | 0.02 |

TABLE III

| Component | Content (% by mass) |
|---|---|
| LDPE (ρ = 0.921 g/m$^3$) | 67.7 |
| Anatase type titanium dioxide | 30 |
| Zinc stearate | 2 |
| Ultramarine blue pigment | 0.3 |

Working examples 1-7 and comparative examples 1-4 were prepared as below.

-Production of Electrophotoraphic Image Receiving Sheet-

Electrophotoraphic image receiving sheets for the working examples 1-7 and comparative examples 1-4 were prepared by coating a composition having the following formulation on the support sheet using a wire coater and drying the coating layer at 90° C. for two minutes at so as thereby to form a toner image receiving layer.

A coating composition having the following formulation was prepared:

| | |
|---|---|
| Mixture of amorphous polymer and crystalline polymer | 100 g |
| Silicone type compound (sold by Shinetsu Chemical Industry Co., Ltd. under the tradename of FL-100) | 1 g |
| Triphenylphosphate | 9 g |
| Titaneum oxide (sold by Ishihara-sangyo Ltd. under the tradename of Taipek @A-220) | 15.5 g |
| Methylethyl ketone | 160 g |

The mixture of amorphous polymer and crystaline polymer in the following proportions per Table IV was prepared:

TABLE IV

| | Toner image receiving layer | | | | | | | |
|---|---|---|---|---|---|---|---|---|
| | Amorphous polymer (g) | | | | Crystalline polymer (g) | | | |
| | A-1 | A-2 | A-3 | A-4 | B-1 | B-2 | B-3 | B-4 |
| Working example 1 | 90 | | | | 10 | | | |
| Working example 2 | 90 | | | | | 10 | | |
| Working example 3 | 90 | | | | | | 10 | |
| Working example 4 | | 90 | | | 10 | | | |
| Working example 5 | | 90 | | | | | 10 | |
| Working example 6 | | | 90 | | 10 | | | |
| Working example 7 | | | | 90 | | | 10 | |
| Comparative example 1 | 100 | | | | | | | |
| Comparative example 2 | | | 100 | | | | | |
| Comparative example 3 | | | | | 90 | 10 | | |
| Comparative example 4 | 10 | | | | | | | 10 |

A-1: Polyester resin (sold by Kao Co., Ltd. under the tradename Tafuton B; Tg: 65° C.)
A-2: Acrylic resin (sold by Sanyo Chemical Industry Co. Ltd. under the tradename of Himer SB-305; Tg: 68° C.)
A-3: Polyester resin (sold by Kao Co., Ltd. under the tradename of Tafuton U-5; Tg: 65° C.)
A-4: Polyester resin (sold by Sanyo Chemical Industry Co. Ltd. under the tradename of Himer SB-75; Tg: 68° C.)
B-1: Polyester resin (Test sample-1; Tm: 140° C.: see Table V)
B-2: Polyester resin (Test sample-2; Tm: 170° C.: see Table V)
B-3: Polyester resin (Test sample-3; Tm: 195° C.: see Table V)
B-4: Polyvinyl alcohol resin (sold by Kuraray Co., Ltd.: Tm: 230° C.)

Subsequently, a backing layer was formed on the back opposite to the side of the support sheet where the toner image receiving layer was formed by coating a composition having the following formulation using a wire coater and drying the coating layer at 90° C. The spread of the coating layer was 12 g/m$^2$ by dry mass.

A coating composition having the following formulation was prepared:

| | |
|---|---|
| Polyester resin dispersion liquid (solid part: 34% by mass): (sold by Toyobo Co., Ltd. under the tradename of Vyronal MD-1200) | 100 g |
| Porous silica (sold by Fuji Sairysia Co., Ltd.) | 28 g |
| Matting agent (sold by Nippon Shokubai Catalyst Co., Ltd under the tradename of Eposter) | 12 g |
| Water | 250 g |

The electrophotographic sheets for working examples 1-7 and comparative examples 1-4 were subjected to qualitative evaluations in connection with toner fixation, adhesion-resistance, cracking, transport quality and image quality (glossiness) in the following test method. The evaluation result is shown in Table VI.

Test images such as a solid white image, a gray image (R=G=B=50%), a 100% black image and a woman's portrait were printed on the respective electrophotgraphic image receiving sheets using a Color Laser Printer, Model C-2220 (Fuji Xerox Co., Ltd.) altered with a belt-fixing device such as shown in FIG. 3. The fixing belt used in the belt-fixing device comprises two layers, namely a silicone rubber layer of 40 μm in thickness and a fluorocrbone siloxane rubber layer of 20 μm in thickness, formed on a polyimide base layer of the fixing belt. The silicone rubber layer was formed by applying a silicone rubber primer, for example, sold by Toray Dow Corning Silicone Co., Ltd. under the tradenabe of DR39-115 to the polyimide base layer, drying it with air for 30 minutes, dip-coating it with a coating liquid consisting of 100 parts of a silicone rubber precursor, for example, sold by Toray Dow Corning Silicone Co., Ltd. under the tradenabe of DY35-796AB and 30 parts of n-hexane to form a coating layer, and heating the coating layer at 120° C. for 10 minutes for primary vulcanization. Successively, the fluorocrbone siloxane rubber layer was formed by dip-coating the polyimide base layer with the silicone rubber layer formed thereon with a coating liquid consisting of 100 parts of a precursor of fluorocrbone siloxane rubber, for example, sold by Shinetsu Chemical Industry Co., Ltd. under the tradename of SIFEL 610 and 20 parts of fluorine type solvent (a mixed solvent of m-xylenhexafluoride, perfluoroalkane and perfluoro(2-butyl tetrohydrofuran)) to form a coating layer over the silicone rubber layer, heating the coating layer at 120° C. for 10 minutes for primary valucanization and then at 180° C. for four hours for secondary valucanization.

The images in a size of 5 cm² were printed in a predetermined pattern essentially at a printing speed of 30 mm/sec, fixed between the heating roller at a temperature of 155° C. and the pressure roller at a temperature of 130° C. In this instance, the binder of the toner had a glass transition temperature of 52° C.

-Evaluation of Toner Fixation-

Black images were printed as test images on the respective electrophotgraphic image receiving sheets using with an electrophotographic copying machine such as Model DCC-500PC sold by Fuji Xerox Co., Ltd. that was altered with a belt-fixing device such as shown in FIG. 3.

The 100% black image was subjected to a cellophane-tape adhesion test for evaluation of toner fixation and measured in terms of optical density of the image before and after the cellophane-tape adhesion test on an Optical Densitometer, Model X-Rite (X-Rite Corporation). The toner fixation was evaluated using the following expression:

(Optical density after toner peeling/Optical density after toner peeling)×100

-Adhesion Resistance-

The electrophotographic image receiving sheet was cut into A4 size sample pieces after left in a specified environment at a temperature of 40° C. and a relative humidity of 80% for 24 hours. Then, The sample sheets were superposed with their toner image receiving layers put face-to-face and weighed down with a load of 500 g per 3.5 cm² and left as they were in the same specified environment as above for 7 days. The adhesion resistance was evaluated in five grades prescribed below according to peeling sound and adherent traces observed when the sample sheets were detached. The electrophotographic image receiving sheet graded by the symbol ⊚ or ○ was rated suitable for practical use.

⊚: No peeling sound and no adherent trace were observed upon detaching the samples.

○: Minor peeling sound and minor adherent trace were observed upon detaching the samples.

Δ: Adherent traces observed upon detaching the samples were less than ¼ of the whole area of the images.

ΔΔ: Adherent traces observed upon detaching the samples was between ¼ and ½ of the whole area of the images.

X: Adherent traces observed upon detaching the samples was greater than ½ of the whole area of the images.

-Evaluation of Cracking-

A uniform image of 10 cm was printed on the electrophotographic image receiving sheet in a maximum density of black using a Color Laser Printer, Model C-2220 (Fuji Xerox Co., Ltd.) and left in a specified environment at a temperature of 10° C. and a relative humidity of 15% for one day. Thereafter, the electrophotographic image receiving sheet was grinded around round bars having diameters of 1 cm, 2, cm, 3 cm, 4 cm and 5 cm, respectively, in descending order in such a way that the printed image is exposed. In the event where the smallest diameter of the round bars that did not in any way inflict a crack on the printed image was 2 cm, the electrophotographic image receiving sheet was rated suitable for practical use.

-Evaluation of Image Quality (Glossiness)-

An images was formed on the electrophotographic image receiving sheet at six different gradations (0%, 20%, 40%, 60%, 80% and 100%) in B/W in 10 cm square area using a belt-fixing type electrophotographic machine for glossiness evaluation. 20° glossiness of the image was measured on Digital Variable Angle Glossmeter, Model UGV-5G (Suga Test Machines Co., Ltd.) by the method in conformity with Japanese Industrial Standards (JIS) Z8741.

-Evaluation of Transport Quality-

The electrophotographic image receiving sheets were continuously transported through electrophotographic machine 200 such as Full Color Laser Printer, Model DCC-500 (Fuji Xerox Co., Ltd.) for transport quality evaluation in terms of feed failure, sheet jamming and accumulation failure. In the event where two or less out of 100 sheets encountered feed failure, sheet jamming or accumulation failure, the electrophotographic image receiving sheet was rated suitable for practical use.

The result of the evaluations is shown in Table VI.

TABLE V

|  | Acid component | Alcohol component | Tg (° C.) | Tm (° C.) |
| --- | --- | --- | --- | --- |
| Test sample 1 | Telephthalic acid | 1,5-pentadiol | 10 | 140 |
| Test sample 2 | 1,4-naphthalene dicarboxylic acid | Ethylene glycol | 64 | 170 |
| Test sample 3 | Isophthalic acid | Ethylene glycol | 50 | 195 |

TABLE VI

|  | Thickness (μm) | Toner fixation (%) | Cracking (ø cm) | Adhesion resistance | Image quality (glossiness) | Transport quality |
| --- | --- | --- | --- | --- | --- | --- |
| Working example 1 | 10 | 94 | 2 | ○ | 88 | 0 |
| Working example 2 | 10 | 91 | 2 | ○ | 85 | 0 |
| Working example 3 | 10 | 89 | 2 | ○ | 82 | 0 |
| Working example 4 | 10 | 90 | 2 | ○ | 84 | 0 |
| Working example 5 | 10 | 85 | 2 | ⊚ | 80 | 0 |
| Working example 6 | 10 | 88 | 2 | ⊚ | 82 | 0 |
| Working example 7 | 10 | 83 | 2 | ⊚ | 78 | 0 |
| Comparative example 1 | 10 | 93 | 2 | Δ | 89 | 4 |
| Comparative example 2 | 10 | 68 | 2 | ○ | 72 | 0 |
| Comparative example 3 | 10 | 94 | 1 | ΔΔ | 89 | 5 |
| Comparative example 4 | 10 | 56 | 4 | ○ | 62 | 0 |

As apparent from Table VI, it is proved that although the electrophotographic image receiving sheets of working examples 1-7 contain no wax and matting agent in their toner image receiving layers, they have a combination of toner fixation, adhesion resistance and transport quality more excellent as compared to any electrophotographic image receiving sheets of comparative examples 1-4 and provide high quality images.

As described above, the electrophotographic image receiving sheet of the present invention has a combination of excellent toner fixation, high adhesion resistance and reliable transport qualities and is suitable especially for use with a high speed fixing electrophotographic image forming machine. Furthermore, the image forming method of the present invention can form high quality images like silver salt photographic images efficiently and readily.

While the invention has been described in detail in conjunction with specific embodiments thereof, it will be apparent to those skilled in the art that various other embodiments and variants can be made without departing from the spirit and scope of the invention.

What is claimed is:

1. An electrophotographic image receiving sheet comprising:
    a support; and
    a toner image receiving layer formed on at least one surface of the support, said toner image receiving layer which contains a mixture of:
    a linear amorphous polymer having a glass-transition temperature (Tg1) in a range of from 40° to 120° C.; and
    a linear crystalline polymer having a melting temperature (Tm) in a range of from 100° to 200° C. and comprising a linear saturated crystalline polyester resin, a mixture ratio of said linear amorphous polymer to said linear crystalling polymer being between 1:9 and 9:1.

2. The electrophotographic image receiving sheet as defined in claim 1, wherein said linear amorphous polymer having a glass-transition temperature in a range of from 50° to 100° C. and said linear crystalline polymer having a melting temperature in a range of from 120° to 170° C.

3. The electrophotographic image receiving sheet as defined in claim 1, wherein said linear amorphous polymer and said linear crystalline polymer satisfy the following condition:

$$1.0 \times Tg1(K) \leq Tm(K) \leq 1.5 \times Tg1(K).$$

4. The electrophotographic image receiving sheet as defined in claim 1, wherein said toner image receiving layer contains said mixture 50% by mass in solid content relative to a composition of said toner image receiving layer.

5. The electrophotographic image receiving sheet as defined in claim 1, wherein said support comprises a base paper sheet having a polyolefin resin layer formed on at least one surface of said base paper sheet.

* * * * *

UNITED STATES PATENT AND TRADEMARK OFFICE
CERTIFICATE OF CORRECTION

PATENT NO. : 7,579,065 B2  Page 1 of 1
APPLICATION NO. : 11/018547
DATED : August 25, 2009
INVENTOR(S) : Yoshio Tani It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 284 days.

Signed and Sealed this

Fourteenth Day of September, 2010

David J. Kappos
*Director of the United States Patent and Trademark Office*